(12) United States Patent
Dutta et al.

(10) Patent No.: US 12,526,291 B2
(45) Date of Patent: Jan. 13, 2026

(54) DETECTING AN ANOMALY EVENT IN LOW DIMENSIONAL SPACENETWORKS

(71) Applicant: Hewlett Packard Enterprise Development LP, Spring, TX (US)

(72) Inventors: Biswadeb Dutta, Chestnut Hill, MA (US); Didier Albet, Mougins (FR); Jean-Charles Picard, Mougins (FR)

(73) Assignee: Hewlett Packard Enterprise Development LP, Spring, TX (US)

( * ) Notice: Subject to any disclaimer, the term of this patent is extended or adjusted under 35 U.S.C. 154(b) by 351 days.

(21) Appl. No.: 18/060,753

(22) Filed: Dec. 1, 2022

(65) Prior Publication Data

US 2024/0098099 A1     Mar. 21, 2024

(30) Foreign Application Priority Data

Sep. 21, 2022   (EP) ..................................... 22306384

(51) Int. Cl.
*H04L 9/00* (2022.01)
*H04L 9/40* (2022.01)

(52) U.S. Cl.
CPC ................................ *H04L 63/1416* (2013.01)

(58) Field of Classification Search
CPC ....... H04L 63/1416; G06N 3/02; G06N 20/00
See application file for complete search history.

(56) References Cited

U.S. PATENT DOCUMENTS

| | | | |
|---|---|---|---|
| 10,867,250 B2 | 12/2020 | Srinivasan et al. | |
| 11,832,953 B1 * | 12/2023 | Shanechi | A61B 5/7275 |
| 11,989,657 B2 * | 5/2024 | Chavoshi | G06N 3/088 |
| 12,044,714 B2 * | 7/2024 | Petladwala | G05B 23/024 |
| 2010/0274539 A1 * | 10/2010 | Virkar | G06N 20/10 703/2 |
| 2015/0106578 A1 | 4/2015 | Warfield et al. | |
| 2017/0330096 A1 | 11/2017 | Das Gupta et al. | |
| 2020/0151577 A1 | 5/2020 | Ogawa et al. | |

(Continued)

OTHER PUBLICATIONS

"Erfani, High-dimensional and large-scale anomaly detection using a linear one-class SVM with deep learning, 2016, Pattern recognition" (Year: 2016).*

(Continued)

*Primary Examiner* — Kevin Ayala
(74) *Attorney, Agent, or Firm* — Sheppard Mullin Richter & Hampton LLP

(57) ABSTRACT

Systems and methods are provided for reducing a number of performance metrics generated by network functions to a number of reduced dimension metrics, which can be used to detect anomalous behavior and generate a warning signal of the detected anomalous behavior. The disclosed systems and methods transform raw performance metrics in a high dimensionality space to a reduced number of metrics in a lower dimensionality space through dimensionality reduction techniques. Anomalous behavior in network performance is detected in the high dimensionality space using the reduced dimension metrics. The systems and methods disclosed herein convert the reduced dimension metrics back to the high dimensionality space, such that the performance metrics from network functions can be utilized to understand and address potential problems in the network.

20 Claims, 16 Drawing Sheets

(56) References Cited

U.S. PATENT DOCUMENTS

| | | | |
|---|---|---|---|
| 2020/0322367 A1 | 10/2020 | Salvat Lozano et al. | |
| 2020/0387797 A1* | 12/2020 | Ryan | G06N 3/084 |
| 2021/0125083 A1 | 4/2021 | Ogawa et al. | |
| 2021/0168651 A1 | 6/2021 | Marquezan et al. | |
| 2021/0200746 A1 | 7/2021 | Huang et al. | |
| 2021/0279230 A1* | 9/2021 | Goel | G06F 16/9024 |
| 2021/0306235 A1 | 9/2021 | Al-Dulaimi et al. | |
| 2021/0406148 A1 | 12/2021 | Bertran et al. | |
| 2023/0344842 A1* | 10/2023 | Akhtar | H04L 63/1425 |

OTHER PUBLICATIONS

"Zubova, Dimensionality reduction methods: The comparison of speed and accuracy, 2018, Information Technology and Control, pp. 151-160" (Year: 2018).*

"Baraniuk, Low-dimensional models for dimensionality reduction and signal recovery: A geometric perspective, 2010, Proceedings of the IEEE, pp. 959-971" (Year: 2010).*

Alameddine et al., "How proactive anomaly detection secures 5G networks", available online at <https://www.ericsson.com/en/blog/2021/8/proactive-anomaly-detection>, Aug. 31, 2021, 10 pages.

Anodot, "Business Analytics: The Future Is AI and It Is Here", available online at <https://web.archive.org/web/20220118080155/https://www.anodot.com/blog/business-analytics/>, Jan. 8, 2022, 6 pages.

HPE, "HPE Intelligent Assurance suite", available online at <https://www.hpe.com/psnow/doc/a00045920enw>, Data Sheet, 2022, 22 pages.

JemDoc, "Spectral Theorem", available online at <https://inst.eecs.berkeley.edu/~ee127/sp21/livebook/l_sym_sed.html>, Feb. 3, 2021, 3 pages.

Rao et al., "Vodafone is partnering with Nokia to build an anomaly detection application on GCP", Analysys Mason Limited. Jul. 2021, 12 pages.

Rao, Anil, "ML/AI-based automated assurance is critical for the success of 5G", White paper, Jan. 2020, 15 pages.

Wikipedia, "Principal component analysis", available online at <Principal component analysis>, Aug. 26, 2020, 29 pages.

* cited by examiner

| Model | Min Total Explained Variance | Max # of reduced dimension metrics | # of input raw metrics | total explained variance | # reduced dimension metrics |
|---|---|---|---|---|---|
| Model #1 | 99 | 10 | 68 | 99.5 | 10 |
| Model #2 | 99 | 9 | 68 | 98.2 | 9 |
| Model #3 | 98 | 8 | 68 | 97.3 | 8 |
| Model #4 | 96 | 6 | 68 | 96.8 | 4 |
| Model #5 | 95 | 3 | 68 | 95.2 | 3 |

FIG. 8

DETECTING AN ANOMALY EVENT IN LOW DIMENSIONAL SPACENETWORKS

CROSS REFERENCE TO RELATED APPLICATIONS

This application claims the priority benefit of EP Patent Application No. 22306384.3, filed on Sep. 21, 2022, the contents of which are incorporated herein by reference in their entirety.

BACKGROUND

With the advent of fifth generation (5G) networks, physical network functions and equipment have evolved into virtualized network functions (VNFs) and containerized NFs (CNFs). Because of this manner of assembly/configuration/operation, network complexity has increased exponentially, and the number of elements/aspects of a network that need to operationalized and managed has also increased, as has the amount of data produced by each NF. Current 5G VNFs/CNFs generate raw data (from 5G RAN/CORE entities) in the form of counters and network and/or service performance metrics, and such counters and metrics are often proprietary or vendor-specific.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 8 is an example visualization of ranking dimension reduced and feature engineered machine learning models in accordance with implementations of the disclosed technology.

Figure 1:
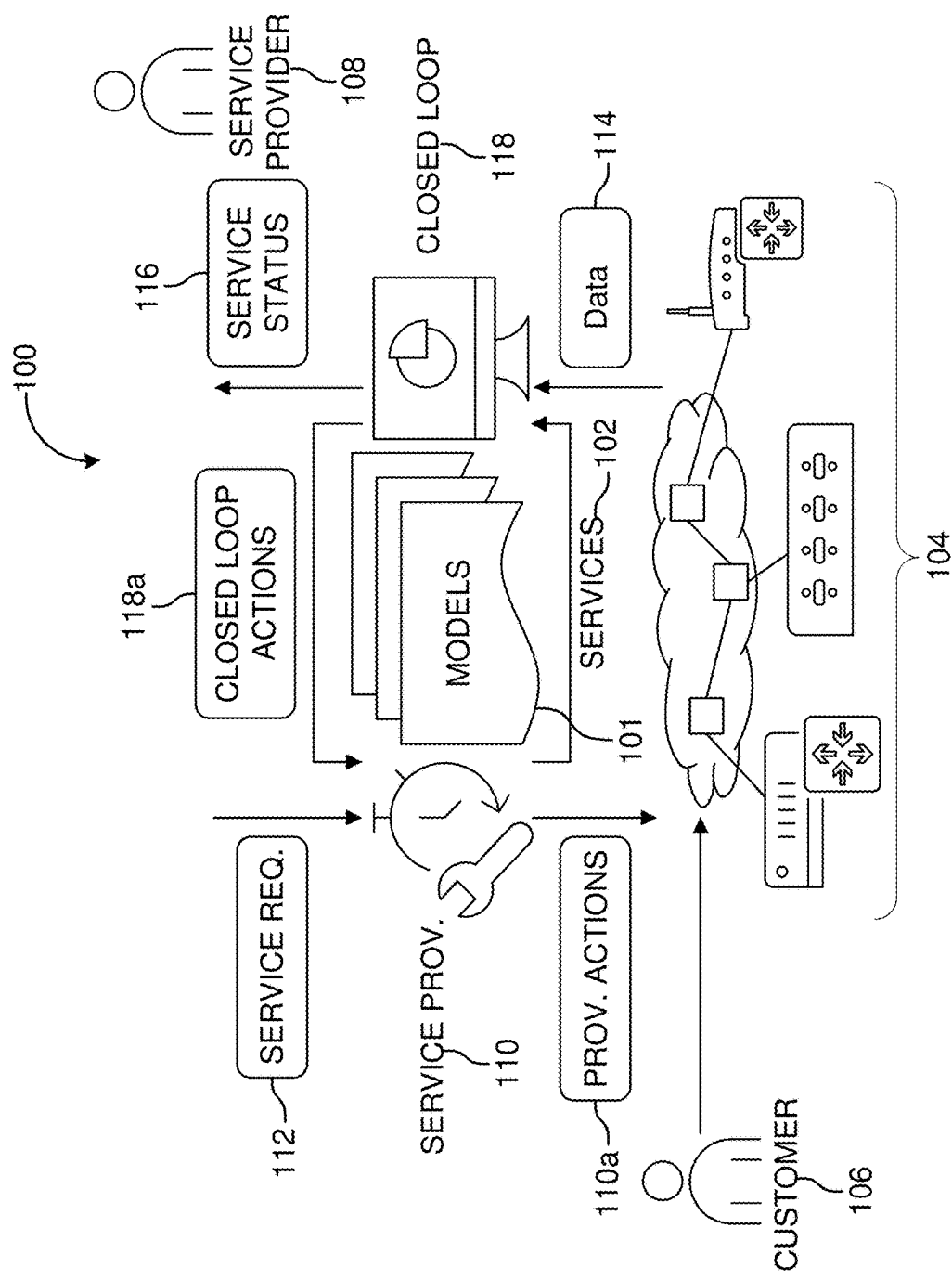
FIG. 1 illustrates an example communication service provider workflow in accordance with implementations of the disclosed technology.

The figures are not exhaustive and do not limit the present disclosure to the precise form disclosed.

DETAILED DESCRIPTION

As described above, complexity in managing emerging 5G communication service provider (CSP) networks, and associated services, has dramatically increased due to the virtualization and containerization of the NFs. As a result, the number of NFs generating management data, such as performance metrics, has increased and each NF itself generates a vast amount of data, which needs to be consumed, analyzed, and transformed into a format that can be easily understood by network operators. Traditional NF management entails setting key performance indicator (KPI) thresholds, and generating events when such KPI thresholds are breached. However, this traditional manner of NF management cannot exploit relationships between KPIs, which could lead to different/more accurate problem isolation, not to mention, applying this method of management would require huge increases in compute resources, and results in delays when detecting anomalous behavior of or in the network.

Accordingly, implementations of the disclosed technology are directed to an anomaly detection system that trains machine learning (ML) models to reduce the number of performance metrics from NFs to a number of reduced dimension metrics (also sometimes referred to as smart-metrics), which can be used to detect anomalous behavior and generate a warning signal of the detected anomalous behavior. The performance metrics may be provided as time-series data, which are transformed to a reduced number of metrics represented as time-series data. Anomalous behavior may be detected as anomaly events in the reduced dimension metrics that deviate from expected or typical behavior, which the ML models are trained to predict/infer/detect from the reduced dimension metrics.

For example, performance metrics may be received from numerous NFs in a high dimensionality space, and the disclosed technology transforms the high dimensionality space to a lower dimensionality space representation through dimensionality reduction techniques. In an example implementation, the disclosed technology applies Principal Component Analysis (PCA) to perform the dimensionality reduction. Extensions of the PCA algorithm can also be used to perform dimensionality reduction, such as, but not limited to, Random-PCA, Sparse-PCA, Kernel PCA, Robust PCA, and L1-PCA. The disclosed technology can detect anomalous behavior in the network performance in the high dimensionality space using the reduced dimension metrics, which can be used to infer or predict problems in the network. The disclosed technology can then convert the data back to the high dimensionality space, such that the performance metrics from NFs can be utilized to understand and address potential problems in the network.

The classical approach to network architecture is based upon fragmented, purpose-built hardware for implementing NFs—also known as physical NFs (e.g., firewalls, deep packet inspectors, network address translators, routers, switches, radio base station transceivers), which require physical installation at every site where they are needed. In contrast, Network Function Virtualization (NFV) aims to consolidate many different network equipment types onto, for example, standardized high volume servers, switches, and storage through the implementation of virtual network functions (VNFs) in software which can run on a range of standard hardware. Further, NFV aims to transform network operations because the VNFs can be dynamically moved to, or instantiated in, various locations in the network as required without the need for installation of new hardware. Furthermore, multiple physical NFs and VNFs can be configured together to form a "service-chain" and packets steered through each network function in the chain in turn.

With the advent of containerization and CNFs (Container Network Functions), dynamicity from edge to core in, e.g., 5G, has become possible, implying a dynamic and software/data-driven approach to network operations may be adopted. As will be described herein, a transition to more proactive management of NFs can be effectuated through the exploitation of large amounts of data generated by these networks.

Current 5G VNFs and CNFs, typically generate raw data periodically in the form of performance counters and/or metrics (collectively referred to herein as NF data streams), which are provided as time-series data that reflect the behavior of the VNFs and CNFs (which will be collectively referred to as NFs). Unfortunately for operations, vendors assembling NFs often include several proprietary counters and metrics. This makes it difficult to compare and understand the respective behaviors of the same NF type (e.g., NFs offering the same or similar functionality) from two different vendors or connected NFs in a multi-vendor network. Standardization bodies, like the International Telecommunication Union-Telecommunication (ITU-T), publish exhaustive documents attempting to standardize Key Performance Indicators (KPIs) that can be used to compare, contrast, and understand data streams from multiple NFs offering the same functionality from different vendors. This situation is further exacerbated by the volume, diversity, and frequency with which 5G VNFs and CNFs generate data. Furthermore, operations can resort to assigning individual persons, with the domain expertise for a specific NF, from a specific vendor, to troubleshoot problems. All put together, this amounts to an extremely expensive mode of operations in a commoditized industry with lean margins.

Traditionally, CSPs manage the NFs, and associated services, by applying thresholds on each of the KPIs, individually, and generating events when the defined threshold is breached. This becomes incomprehensible very quickly as the number of NFs, and the number of KPIs per NF, explodes, for example, due to the virtualization and containerization of the network functions. Moreover, such an approach can miss exploiting the statistical relationships between related KPIs corresponding to different vendors that could lead to identifying and isolating a completely different problem as compared to individual consideration of related KPIs. Furthermore, the approach of processing each of the time-series data streams, associated with each of the KPIs individually, and concurrently, can lead to an exponential increase in the needed computational resources to process the significant amount of data. Further still, limitations can exist in working with KPIs themselves. For example, KPIs are aggregated quantities, typically synthesized every several minutes (e.g., every 15 minutes in various cases), from raw data that is generated at a much higher frequency. This introduces a time delay in the detection of the undesirable (e.g., anomalous) behavior and can often miss subtleties in the raw data, because aggregation may be achieved most often by some form of averaging, which masks out finer irregularities resulting in information loss. For example, aggregation may be achieved by calculating coarse grain data by averaging fine grain data within sequential windows of time (e.g., 15 minutes) into single data points for the coarse grain data.

As a result of the above, it can be difficult for a network operators to detect which set of metrics are indicative of a problem at a given point in time, because to do so requires the network operator have a strong and thorough knowledge of the network. This is true especially since the raw metrics are generally time-series and individual time-series themselves are notoriously difficult to diagnose for an abnormal behavior by eyeballing them, leave alone an entire vector space of them with a dimensionality running into the hundreds.

Accordingly, implementations of the disclosed technology use a two-stage sequence that includes (1) applying dimensionality reduction techniques to transform performance metrics received from NFs in the form of raw data streams from a high dimension space to one or more reduced dimension metrics in a low dimension space and (2) detecting anomalies in the reduced dimension metrics through the use of trained ML models. The ML models may be supervised (e.g., an ML model trained using labeled datasets to train ML algorithms to classify data or predict outcomes) or unsupervised models (e.g., an ML model trained to learn patterns from unlabeled data by capturing patterns as probability densities). As used herein, raw data streams or raw metrics received from NFs may be referred to as "high dimension metrics."

The reduced dimension metrics (e.g., principal components in PCA) cannot be interpreted or understood directly by a network operator as they are not in a "physical" dimension or domain. They are dimensionless/domainless and synthetic. Identification of an anomaly from reduced dimension metrics having synthetic dimensions are not interpretable directly by network operators. Thus, to understand detected anomalies, the reduced dimension metrics must be related back to the physical dimensions, where real measurements are made and understood by network operators. In standard machine learning applications of dimensionality reduction techniques, such as computer vision, medical imaging, and so on, reverting to the physical dimensions is unnecessary. For example, in medical imaging for example, PCA may be used as a technique to reduce the dimensionality of the original image, and then the principal components are passed into a classifier to identify whether a tumor is benign or cancerous if a match is made. The situation is similar in the case of image classification. However, in the disclosed technology, once anomalous behavior is detected in the synthetic or low dimension space, the reduced dimension metrics are mapped back to the physical dimensions to understand how to remediate the problem. Application of dimensionality reduction techniques disclosed herein and transformation back to the subset of physical dimension space may help identify where and what went wrong or misbehaved in the network.

Accordingly, implementations of the disclosed technology provide for anomaly event detection in the synthetic, reduced dimension space. Implementations disclosed herein may rank high dimension metrics according to importance of each high dimension metric to the detected anomaly event and isolate one or more high dimension metrics causing the anomaly. For example, when an anomaly is detected in the reduced dimension space, the high dimension metrics related to each of the one or more reduced dimension metrics can be retrieved from the reduced dimension space and used to analyze the event. The impact of the high dimension metrics on one or more reduced dimension metrics can be ranked by order of impact and/or contribution to the anomalous event detected in the high dimensionality space. For example, the high dimension metrics can be ranked according to a linear relationship between variances of physical dimensions (e.g., high dimensionality space) and variance of the reduced dimensions. Accordingly, the disclosed technology reduces a mass of undecipherable data to actionable insight, which can be intuitively presented to the network operators for simplified consumption. Network operators can then exploit the result to understand the impact of an anomaly on the physical dimensions, come up with an explanation for the observed anomaly, and consequently take the appropriate remediation action.

For example, implementations utilizing the PCA algorithm transform the physical dimensions to principal components. Post transformation, the implementations disclosed herein organize the principal components in descending order of the value of the variances. In other words, the PCA algorithm ranks the principal components by the variance associated with each of them. This result follows by exploiting the fact that the principal components transformation can be considered as a transformation to a coordinate system which diagonalizes the empirical sample covariance matrix of the physical components. Using this result, the eigenvalues, or variances, of the principal components can be expressed as a linear combination of the variances of the physical components. Exploiting this result further, the impact of a detected anomaly, in the principal component, on the associated physical components can be ranked by the values of the coefficients of the linear combination of their variances. Network operators can then exploit this ranking to understand the impact of an anomaly on the physical dimensions, come up with an explanation for the observed anomaly, and consequently take the appropriate remediation action.

The disclosed technology, according to some implementations, can generate a visualization of the low dimension space and the high dimension space. The visualization can include a graphical user interface (GUI) that can present a graphical icon presenting a warning signal responsive to an anomaly event detected in the reduced dimension space. The GUI can display one or more reduced dimension metrics that detected the anomaly event, for example, as a graphical depiction of the metric as time-series data. Furthermore, the disclosed technology can transform the reduced dimension metrics back to the high dimension space and the GUI can display, for the detected anomaly event, a number of the highest ranked high dimension metrics correlated to the anomaly event for further network diagnosis and corrective measures. Accordingly, the disclosed technology provides for isolating physical, high dimensions metrics from NFs causing an anomalous behavior, displaying the isolated metrics to a network operator for further problem diagnosis, ranked according to importance to the detected anomaly behavior. As a result, the disclosed technology can significantly simplify the task of the network operator, reduce computational hardware consumed to identify a problem with or in the network, remove costs associated with computing the standardized KPIs, and remove costs associated with retraining network operations' staff with specialized domain knowledge of the NF. Further, the disclosed technology reduces and can remove having to deal with the high dimensionality, frequency, and latency associated with the detection of problems in such situations.

As used herein, "correlated" or "correlate" refers to a scenario where two or more metrics (either two or more high dimension metrics, two or more low dimension metrics, or a combination thereof) increase under the same or similar time conditions (e.g., the metrics each increase at the same time, but not necessarily the same rate). Similarly, "anti-correlated" may be used to refer to a scenario where two or more metrics move in opposite directions. For example, one metric may increase while a second decreases.

The systems and methods disclosed herein for metric dimensionality reduction, anomalous event detection, and generating warning signals involve a "data collection" phase, a "design" phase, an "operationalization" phase, and a "production run-time" phase.

In the data collection phase, high dimension metrics are received as historical raw metrics data sources, such as NFs deployed on the network. Historical raw metrics are provided as time-series data streams from the NFs as representative of historical NF operational situations, including prior anomalous behavior. Examples of performance metrics received from the NFs included, but are not limited to, CPU utilization, memory consumption, number of bytes/octets in/out of the NF, number of packets in/out of the NF, amongst others. As described herein, the performance metrics from the various NFs on the network can be exceedingly numerous and vendor specific, as well as NF type specific. The historical raw metrics are stored in a database, database partition, or other data repository.

In the design phase, a machine learning (ML) algorithm is applied to a historical collection of metrics, according to training parameters, to generate a plurality of ML models. ML can refer to methods that, through the use of algorithms, are able to automatically extract intelligence or rules from training data sets and capture the same in informative models. In turn, those models are capable of making predictions based on patterns or inferences gleaned from other data input into a trained model. There has been a push to implement machine learning in enterprise environments, e.g., businesses, so that these entities may leverage machine learning to provide better services and products to their customers, become more efficient in their operations, etc. According to implementations of the disclosed technology, the ML algorithm comprises, among other aspects, algorithms implementing dimensionality reduction techniques, such as, PCA or the like.

The historical raw metrics are input into the ML algorithm as training data. The historical raw metrics are time-series data as each value of the raw metric is indexed in time. This applies as well to events and/or log data. Using the historical raw metrics, the ML algorithm automatically generates a plurality of dimension reduction ML models according to training parameters (described below). The dimension reduction ML models are trained to transform the high dimensionality raw metrics to low dimensionality metrics and replicate NF behavior by approximating NF behavior from the low dimensionality metrics. For example, each dimension reduction ML model reduces the historical raw metrics to a number of reduced dimension metrics and attempts to replicate NF behavior using the number reduced dimension metrics. As an illustrative example, a first ML model may reduce the historical raw metrics to two reduced dimension metrics and use the two reduced dimension metrics to replicate the NF behavior. Accuracy of this replication may correspond to the models ability to recognize explained variances (e.g., amount of original information that is represented in the reduced dimension metrics) in the original metrics using the reduced dimension metrics. A second ML model may reduce the historical raw metrics to three reduced dimension metrics, which are used to replicate the NF behavior. A third ML model may use four reduced dimension metrics, etc. For each ML model, an accuracy indicator of the ML models ability to replicate the NF behavior and explain variance in the behavior may be output for each model. The accuracy indicator may be provided as a value indicative of the accuracy of the replication, for example, a number of variances in the original metrics explained by the reduced metrics. For example, the accuracy indicator may be provided as a percentage of variances captured by the respective number of reduced dimension metrics. That is, the number of variance from the high dimension metrics that are also reflected (or shown) in the reduced dimension metrics. It should be noted that degrees of accuracy can vary depending on the system/network at issue, the needs of a CSP, the aspect(s) the CSP wishes to replicate, etc. Thus, the term "accurate" is not limiting, and different levels of accuracy may be sufficient to deem a particular model an accurate replication of the NF behavior. The trained reduced dimensionality ML models are stored in a model registry, model database, model database partition, or other data repository.

For example, the ML algorithm can be implemented as a PCA algorithm configured to synthesize the historical raw metrics (e.g., physical metrics or components) into a new set of components (e.g., reduced dimension metrics also referred to as principal components), such that variances of the principal components are amplified and maximal across each of them respectively. The largest variance can be assigned to the first principal component, the second largest variance assigned to the second principal component, and so on. The projection of physical components on the first principal component maximizes the variance. Note that the total variance across all physical components is the same as the total variance across all principal components.

With continued reference to the forgoing example, each of the principal components can be expressed as a linear combination of physical components. From this, any result obtained using the principal components can be predicted and/or reconstructed in terms of the original physical components. As a result, anomaly detection results in the principal components can be interpreted and related in terms of anomalous behavior in the physical components. Similarly, the variance of each of the principal components can be expressed as a linear combination of the variances of the respective physical components.

Further, in the context of computer systems, applications, and network equipment/functions, large variations in the physical components are a good measure indicating departure from normal behavior. Since VNFs and CNFs are associated with (e.g., supported by) a very large number of physical components, sometimes of the order of a couple of hundred, the network operator is challenged to detect or identify anomalous behavior. This is because human cognition gets weaker as the dimensionality of the problem increases. Thus, identifying anomalies from the principal components of the transformations disclosed herein can simplify the problem of detecting abnormal behavior, and permits network operators to focus their attention on physical components associated with the principal component.

Furthermore, the disclosed implementations limit the number of principal components that need to be analyzed. The concept of "total explained variance" can be exploited to determine the minimal number of principal components needed to characterize the behavior of the network function. The disclosed ML algorithms maximize the variance of the first "K" principal components and minimize the variance of last "N-K" principal components. So, the first "K" components may have the highest variance out of the remaining principal components. In various implementations, "K" is chosen to be sufficiently large such that the information lost in ignoring the remaining "N-K" principal components is negligible. Accordingly, the dimensionality reduction performed by the ML algorithms disclosed herein can minimize the information loss for certain signal and noise models. In other words, the "total explained variance" is selected ensuring that the information lost is minimal, and one is still able to narrow down on the subset of physical components responsible for observed anomalous behaviors.

As alluded to above, the dimension reduction ML models are trained according to training parameters, which may be used to constrain the training. Examples of training parameters may include information indicative of an NF for which ML models are to be generated, such as, an identification of one or more NF vendors and/or an NF type. Another example training parameter may be a time window of the historical raw metrics to be used (e.g., the most recent week, month, etc. or a historical range of time). Further, training parameters may include training instance information in the form of upper and lower bound threshold criteria. For example, the upper bound threshold of the training may define a maximum number of reduced dimension metrics, while the lower bound threshold may define a minimum replication accuracy.

In the operationalization phase, at least one dimension reduction ML model is identified for deployment and deployed on production run-time machines, such as VNFs and/or CNFs. According to various implementation, a single dimension reduction ML model is identified for deployment. Implementing machine learning into the enterprise context, also referred to as operationalization, can involve the deployment (and management) of models, i.e., putting models into production.

In the production run-time phase, the production run-time machines will receive real-time incoming data streams (e.g., high dimension metrics) from the NFs on the network, such as raw performance metrics and/or counters, which are input into at least one dimension reduction ML model. The dimension reduction ML model then generates reduced dimension metrics according to the model, which are used to detect anomaly events in the reduced dimension space. For example, the production run-time machines may analyze the reduced dimension metrics to detect anomaly events in NF performance from the reduced dimension metrics and generate warning signals to inform a network operator of the detected behavior.

It should be noted that although various embodiments are described in the context of NF instances, embodiments are not necessarily limited to NFs. That is, any system or network application or aspect(s) that can be used as a basis for predicting some anomaly or abnormal behavior can be leveraged. Moreover, predicted events need not be limited to system anomalies. That is, a system can be monitored with respect to messages, events, or other status indicators of a particular aspect(s) of the system that a CSP (or other entity) wishes to track and predict.

FIG. 1 illustrates an example CSP workflow 100 that is representative of actions, operations, events, etc. that may occur in the context of service fulfillment and service assurance. The term "service" as utilized herein, can refer to the orchestration of changes in a (often complex) system of interactive services, networks, and systems for the creation of communication services or products. For example, a service can be an entity, class, node, vertex, etc. Accordingly, in a traditional sense for example, a service can be some collection of actions effectuated through one or more computational/memory resources (physical and/or virtual) that produce a desired result, but underlying that collection of actions are parameters, relationships, and/or potential actions impacting or involving one or more of the actions making up the collection of actions.

As illustrated in FIG. 1, services 102, e.g., a 5G service, may involve certain physical, virtual and/or containerized resources implemented on infrastructure 104, such as servers, wireless local area network (WLAN) devices, e.g., access points, routers, etc. Following the 5G service example, it should be understood that resources, like services, described above, can be, but are not limited to components, aspects, objects, applications, or other elements that provide or act as a prerequisite to such element, e.g., another resource or service. For example, infrastructure 104 can include connections to/from one or more physical and/or virtual infrastructure, which can also be resources. In some implementations, a resource can refer to a first service that is in an active state before another service is designed or utilized to effectuate the first service. Furthermore, in some implementations, services and resources can be hierarchical and nested. Such services 102 can be provided to a customer 106 by a service provider 108 upon being provisioned through a service provisioning mechanism/process 110 and corresponding provisioning actions 110a in response to service requests 112 from, e.g., a customer relation management (CRM) layer. In particular, services may be defined (e.g., a service's appearance and/or how a service is built) in a catalog that may also reflect relationships between services (parent-child and/or linked relationships, inheritance relationships, etc.). It should be understood that services and services' structure can be maintained in a service inventory. Service requests 112 may include service data collection, service order validation, service order orchestration, service order tracking and/or management, and the like. Based on the building blocks that define a service, the service resources may be activated. Accordingly, the services 102 may be specified as models 101.

As alluded to above, and following the example 5G service, a 5G service may be deployed on multiple premises using a combination of hardware (e.g., servers, antennas, cables, WAN terminations), Virtual Network Functions (VNFs) and Containerized Network Functions (CNFs). Such services may be used for intercepting various types of mobile traffic generated by client devices in the premises, and/or directing specific traffic to applications hosted by the enterprise. Such services may also be part of an end-to-end service, providing functionalities such as data-reduction, analytics, remote monitoring and location-aware services used by the customers and employees. Another service example may be a classical cloud-like service offering, but combined with network service offerings, such as different security zones (customer, employee, legal, etc.) combined with firewalling, routing configurations, and extensions to end-customer premises.

Any issues or problems that exist or may arise regarding any service(s) may be identified through the collection of observability data like metrics and counters, events, and probe data 114 from the physical, virtual and/or containerized resources implemented on infrastructure 104. A service impact analysis may be performed to determine a service's status 116, and service provider 108 may be informed of any such issues/problems. Resolution of such service issues/problems can be automated via closed loop remediation processing 118 that are realized with closed loop remediation actions 118a, and healing or remediation processes may be triggered.

Figure 2:
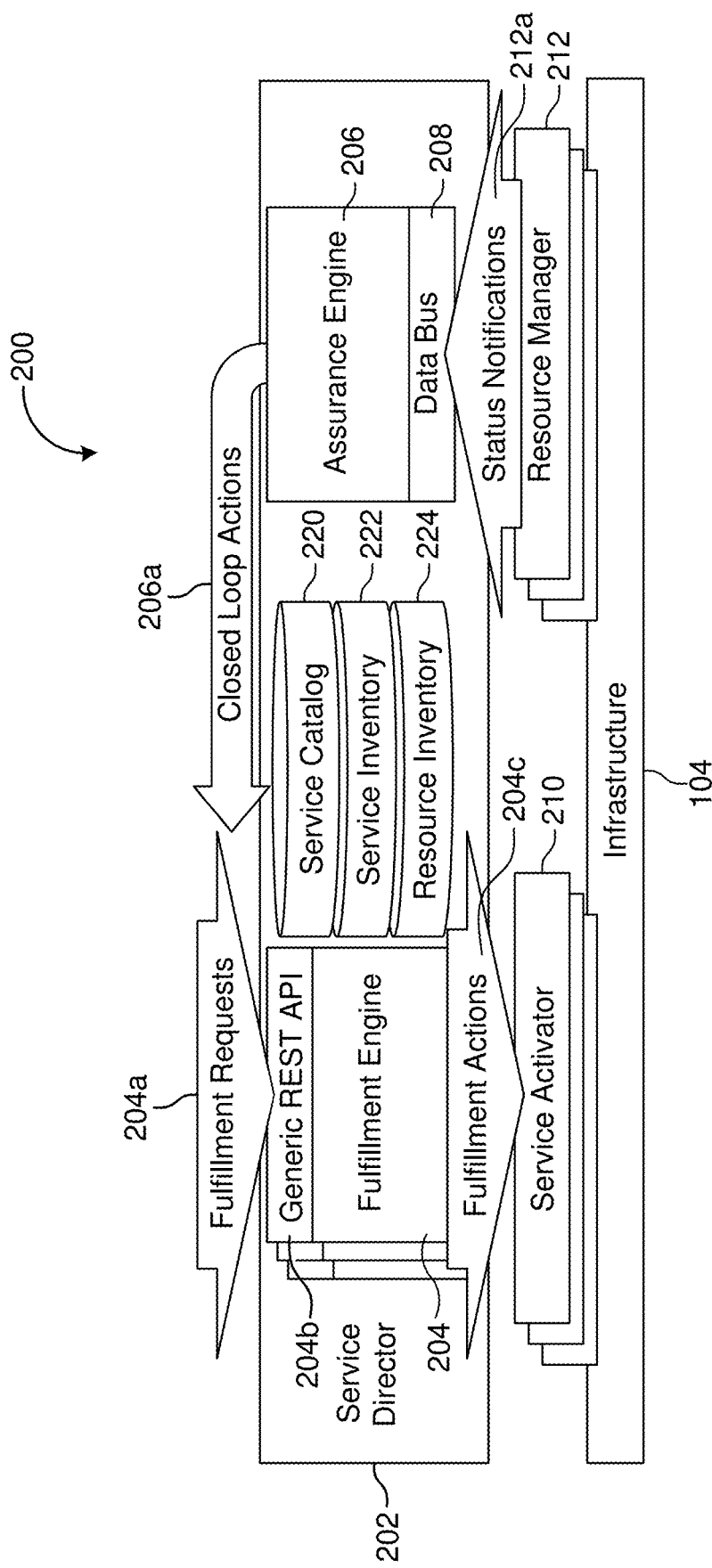
FIG. 2 illustrates an example communication service provider system architecture in accordance with implementations of the disclosed technology.

FIG. 2 is a schematic representation of a CSP system architecture 200 that includes service fulfillment and service assurance functionality. A service director 202 may refer to a model-based orchestration engine for managed hybrid services. Service director 202 may, in some embodiments, comprise a service fulfillment engine 204 and a service assurance engine 206. In accordance with various embodiments, a closed loop framework or mechanism for addressing both service fulfillment and assurance can be realized, although a closed loop framework is not necessary. That is, and as alluded to above, service-level issues, problems, etc. can be addressed automatically by service fulfillment actions. In other words, the same mechanism (service fulfillment engine 204) used to provision/fulfill service requests can be used to solve service incidents identified by, and as instructed by service assurance engine 206. Moreover, as can be appreciated from FIG. 2, that a single service inventory 222 is implemented (as well as a single service catalog 220 and a single resource inventory 224) between service fulfillment engine 204 and service assurance engine 206.

For example, fulfillment (service) requests 204a may be received by service director 202 via a RESTFUL application programming interface (API) 204b. Service fulfillment engine 204 may perform various fulfillment (service provisioning) actions. In particular, service fulfillment engine 204 may define services through mathematical models and store these service definitions in a service catalog 220, which may be a database, database partition, or other data repository. Moreover, service fulfillment engine 204 may orchestrate service instantiation based on defined rules and policies. As a result of such service instantiation by service fulfillment engine 204, a service inventory 222 can be automatically populated. It should be understood that service inventory 222, like service catalog 220, may be a database, database partition, or other data repository. Service inventory 222 can contain versions products, services, and/or resources as defined in the service catalog 220, while a resource inventory 224 may contain information regarding resources (e.g., elements of infrastructure 104) that can be leveraged to provide services. A service activator 210 may implement or carry out execution of the fulfillment actions 204c (i.e., executing commands regarding service provisioning) on the requisite resources comprising infrastructure 104.

Once a service(s) is instantiated and operational for a CSP, from the service assurance perspective, a resource manager 212 may perform, e.g., resource monitoring on the physically and/or virtually-implemented resources, and status notifications 212a (e.g., counters and metrics) can be collected and distributed to an enterprise service bus, data bus, or similar integration system. In this embodiment, a data bus 208 may be used, such as Apache Kafka®, an open-source stream-processing software platform, generally leveraged for handling real-time data feeds. Other data buses include, but are not limited to, Amazon Kinesis®, Google Pub/Sub®, and Microsoft Event Hubs®. Moreover, as will be described in greater detail below, this resource monitoring by resource manager 212 may provide the requisite information or data, e.g., time series counters and/or metrics from resources servicing the network from infrastructure 104, such as NF. In the data collection phase, time-series data streams are provided to the data bus 208 from the physical and/or virtual resources implemented on the infrastructure 104 (e.g. NFs deployed on the network), which contain counters and metrics of performance of the physical and/or virtual resources. In the design phase, the assurance engine 206 applies historical data-streams as training data input into a ML algorithm and trains a plurality of dimension reduction ML models. Scoring is performed on the dimension reduction ML models, and the model having the optimal score is deployed on the production run-time machines (e.g., the physical and/or virtual resources implemented on the infrastructure 104) during an operationalization phase. Moreover, upon operationalization of the aforementioned production run-time models, resource manager 212 may begin to receive predictive notifications, e.g., early warning signals of impending system failure, degradation, etc.

Resource inventory 224 may comprise a data repository in which records including physical, logical, and/or virtual resources that are available to be used to implement a particular service(s). For example, resource inventory 224 may maintain information regarding infrastructure elements on which virtualized resources may be instantiated to realize a requested service that service fulfillment engine 204 seeks to fulfill/provision.

While logical and virtualized/containerized resources are discussed, it is to be understood that these will ultimately, e.g., at a low level of implementation detail, be implemented using physical computing, storage or network, i.e. hardware, resources. For example, a network function virtualization infrastructure may comprise virtual computing (e.g., processor), virtual storage (e.g., hard disk) and virtual network (e.g., virtual network interface controllers) resources implemented on a virtualization layer (e.g., implemented by one or more hypervisors or virtual machine monitors). The virtualization layer may then operate on hardware resources such as processor devices, storage devices and physical network devices, for example as provided by one or more server computer devices.

The resource manager 212, together with the resources defined in resource inventory 224, provide entity-action building blocks based on a physical and/or virtual infrastructure 104 that may be combined in the form of a descriptor to enable the provisioning of a service. Service fulfillment engine 204, as alluded to above, performs the requisite orchestration to provide the desired network function virtualization, while resource manager 212 determines how to orchestrate the resources for supporting the desired network function virtualization.

In FIG. 2, a data bus 208 may be used for messaging, storage, and enriching/processing of any data, e.g., counters and/or metrics from physical and/or virtual resources in the infrastructure 104 arising from the resource monitoring of the services provisioned by the service fulfillment side of service director 202, which can be typical behavior of the resources, including any anomalous behaviors such as lost communications, lost service, resource failures, service quality level falling below a threshold, quality of user experience becoming unacceptable, etc. Service assurance engine 206, upon receiving time-series metrics and/or counters can perform dimensionality reduction on the input metrics and apply an anomaly detection engine to detect anomalous events and determine how the service and/or resource can be healed by addressing the issues. Again, and as alluded to above, upon operationalization of production run-time models disclosed herein, system issues can be predicted, and notifications can be generated ahead of such system issues occurring. Service assurance engine 206 may send closed loop actions 206*a* (described above) to the fulfillment engine 204, effectuating a closed loop, so that fulfillment engine 204 can carry out the necessary actions to achieve the requisite service assurance.

Figure 3:
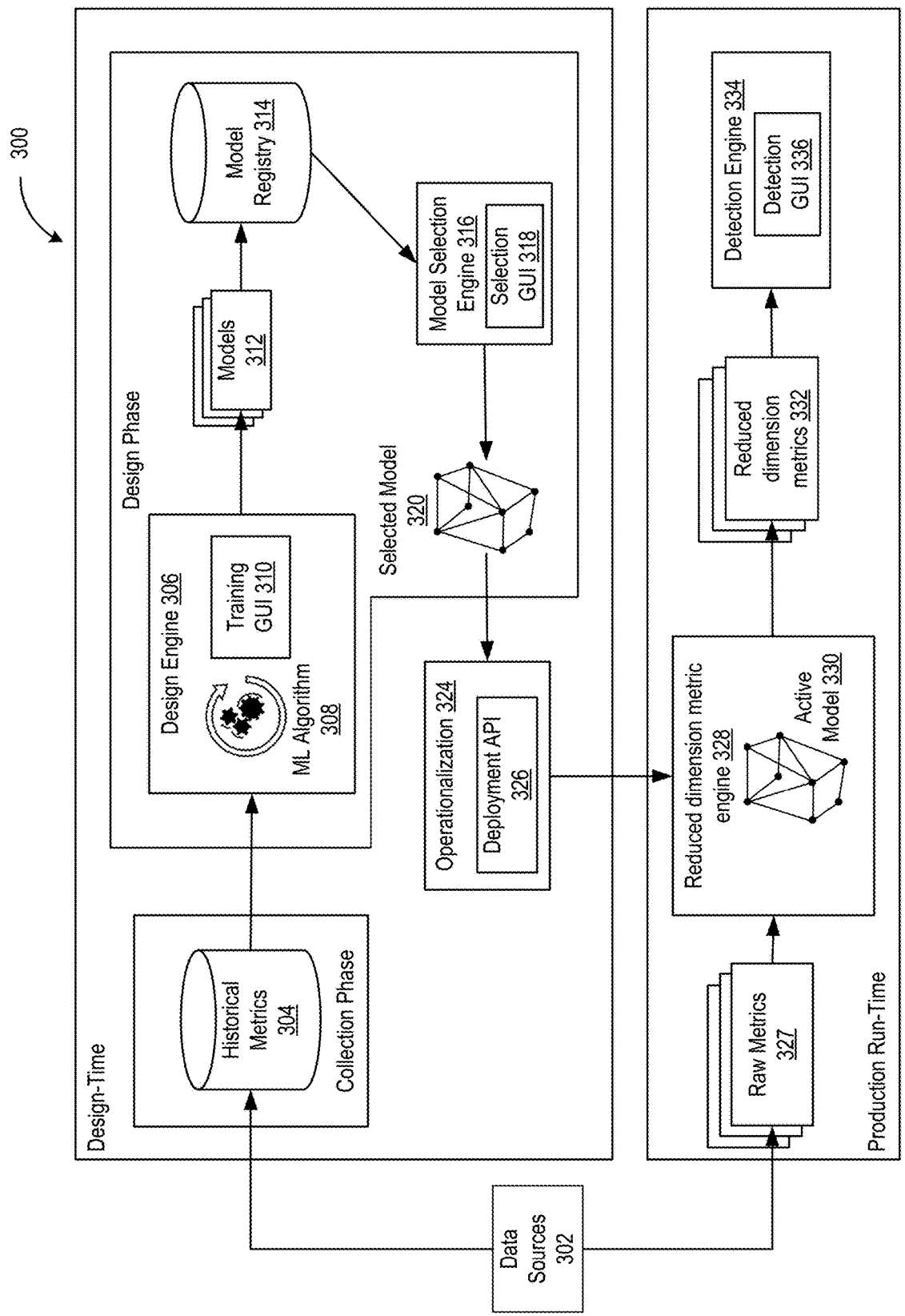
FIG. 3 illustrates an example anomaly detection system in accordance with implementations of the disclosed technology.
Figure 4:
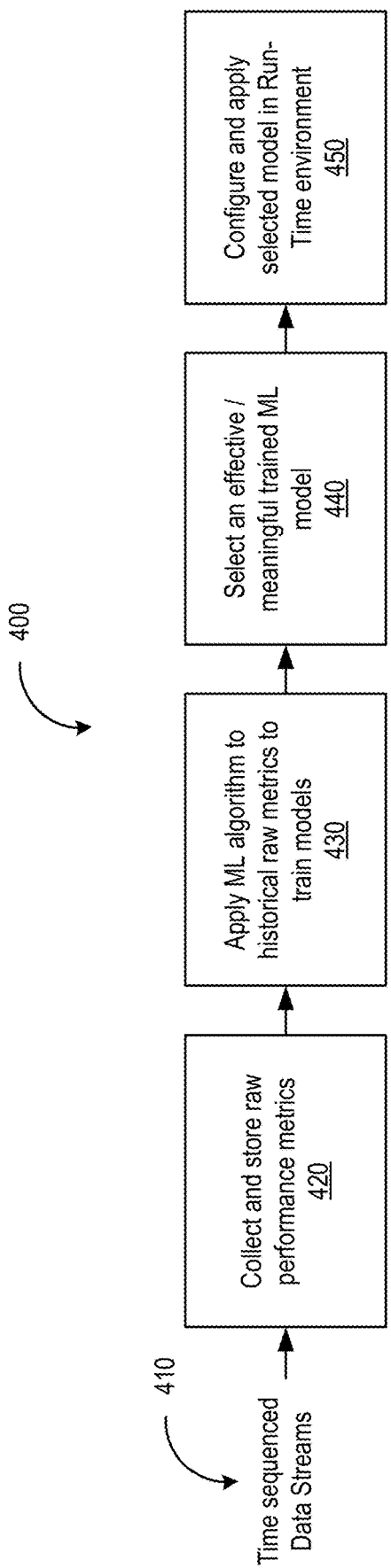
FIG. 4 is a process flow of example operations performed by the anomaly detection system of FIG. 3 in accordance with implementations of the disclosed technology.

As alluded to above, dimensionality reduction and anomaly detection can be accomplished over the course of a collection phase, a design phase, an operationalization phase, and a production run-time phase. FIG. 3 is a schematic representation of an example architecture for an anomaly detection system 300 embodying these three phases separated into design-time and run-time. FIG. 4 is a process flow 400 of example operations performed by the system 300 over the course of the various phases. The process 400 will be described hereinafter in the context of system 300. System 300 may be implemented, for example, as part of assurance engine 206 of FIG. 2.

As illustrated in FIG. 3, data sources 302 commit raw performance metrics to historical database 304 during the collection phase (operation 410), for example, via data bus 208 of FIG. 2. Data sources 302 may represent one or more systems, system components, NFs, etc. from which performance metrics and counters can be received as time-series data streams, such as the physical and/or virtual resources of infrastructure 104 of FIGS. 1 and 2. At operation 420, database 304 can store received data, such as raw performance metrics and/or counters, and convert the data to a format used for reporting visualization, analytics, machine learning, etc. Database 304 retains historical performance metrics over a range of time periods that are representative of typical operational situations of the data sources 302. Typical operational situations should be representative of typical behavior over a given time window, which may include any number of anomalous events and/or variances in operation. However, erroneous data and/or data streams missing data entries may be handled from the historical database 304 to ensure that machine learning algorithms are not presented with such "gaps." Since both the volume and throughput of the data streams are large, tools and platforms that are capable of handling this volume and throughput may be used, such as such as Apache Kafka®, Amazon Kinesis®, Google Pub/Sub®, Microsoft Event Hubs®, etc. Such technologies are engineered to address the needs of high throughput, large data volumes and allow computational results to be generated in real-time or near real-time at worst, within the available computational resources, and database 304, in this context, may be used to persist or host incoming data, large in volume and high in throughput, which is subsequently processed by the systems methods described herein.

As described above, typical raw performance metrics include CPU utilization, memory consumption, number of bytes/octets in/out, number of packets in/out, amongst several others. Some examples of counters include number of subscribers successfully registered/dropped/failed, number of active protocol data unit (PDU) sessions, amongst several others. The quantitative units and magnitude of the metrics vary significantly from one metric to another, and between vendors. Accordingly, at operation 420, the system 300 may normalize the units and scale the magnitude of each metric, for example, to a zero-mean and unit standard deviation, so that each metric has normalized features. Such operations may be referred to "standard scaling." In some examples, "min-max scaling" may be used in place of "standard scaling." The normalization and standardization of the raw metrics may be performed prior to storage in the historical database 304 or upon retrieval from the database 304 by downstream components of the system 300.

Furthermore, in some implementations, the system 300 may execute a smoothing operation on the raw performance metrics since the metrics are, more often than not, time-series data. For example, a step of calculating a "moving average" or "exponential moving average" of raw metrics may be performed to smoothen the time-series data. Moving average and/or exponential average may serve to enhance interesting features in the time-series data that might otherwise be masked to a certain extent. A moving average may be computed across a fixed sliding window that is moved one unit of time for each computation. The moving average may function as a way of smoothing out "noise" or statistical fluctuations in time-series data. An exponential average is a mechanism that averages over values of a random variable given by time-series data in such a way that the weight associated to each earlier value is weighted with a smaller weight. In other words, the value at time t[n−1] is assigned a lower weight than the value at time[n], and so for the value at t[n−2]. The smoothening operation may be performed before or after the normalization. In various implementations, the smoothing operation is performed after the normalization.

During the design phase at operation 430, historical performance metrics are retrieved by design engine 306 from the database 304 and applied to a ML algorithm 308, which generates a plurality of dimension reduction ML models 312 trained on the historical performance metrics according to training parameters. As detailed above, due to virtualization and containerization of the NFs, the historical performance metrics include a vast amount of data having significantly numerous domains (e.g., dimensions) according to NF type, NF vendor, etc. As a result, the historical performance metrics are retrieved from the database 304 in a high dimension space, having numerous distinct metrics. The ML algorithm 308 comprises, among other aspects, algorithms implementing dimensionality reduction techniques, such as, PCA or the like. Accordingly, the ML algorithm generates a plurality of dimension reduction ML models that transform high dimensionality raw metrics to reduced dimension metrics in a lower dimensionality space. The dimension reduction ML models then replicate NF behavior in the low dimensionality space by approximating the original behavior using the reduced dimension metrics. Each dimension reduction ML model reduces the historical raw metrics to a respective number of reduced dimension metrics (e.g., 1, 2, 3, etc.) and attempts to replicate NF behavior using the reduced number of dimension metrics. The accuracy of the replication can be quantified by the design engine 306 indicative of a respective ML model's ability to replicate or approximate the NF behavior and explain anomalous behavior using the respective number of reduced dimension metrics. The quantification can be provided as an accuracy indicator, which may be provided as a value representative of the accuracy and/or number of anomalies, from the high dimension metrics, explained by the reduced dimension metrics. For example, the replication accuracy indicator may be provided as a percentage of variances from the original metrics that are explained using the respective number of reduced dimension metrics. The design engine 306 may generate a score for each of the ML models, for example, by providing a number of reduced dimension metrics generated by each ML model and a corresponding accuracy indicator. Each trained reduced dimensionality ML models is stored in a model registry 314, such as a database, database partition, or other data repository, in association with corresponding score, e.g., number of reduced dimension metrics and corresponding replication accuracy indicator.

Training parameters, such as identification of a NF vendor and/or NF type may be used to retrieve performance metrics related to the identified vendor and/or type so to train dimension reduction ML models 312 for the identified vendor and/or type. Additionally, to train models representative of anomalous situations experienced by an NF, data samples spanning time windows large enough to encompass a number of anomaly events may be selected such that the training data includes several instances of such anomalous situations. Selecting skewed samples to train the ML models could lead to underfitted models exhibiting high inaccuracy or high bias, as well as models that behave as if overfitted with a high variance, thus rendering them ineffective when used to predict or infer behavior from input, unlabeled data. As such, training parameters may include a time window for retrieving historical performance metrics within the window so to include a desired number of anomalous situations. In some examples, a time window of the most recent 1 month may be sufficient, while in other situations a smaller or larger window may be desired. Further, training parameters may include training instance information in the form of upper and lower bound threshold criteria. For example, the upper bound threshold for a training instance may define a maximum number of reduced dimension metrics, while the lower bound threshold may define a minimum accuracy indicator. A training GUI 310 may be provided to allow network operators to input training parameters.

The model selection engine 316 selects at least one of the trained dimension reduction ML models for deployment on production run-time machines (operation 440). For example, dimensionality reduction techniques transform the physical high dimension space into orthogonal subspaces of reduced dimensionality, enabling the variances of the reduced dimensions of this orthogonal space to be ranked. Taking advantage of the concept of "total explained variance," post application of ML algorithm, the analysis can be limited to a subset of the reduced dimension metrics contributing the highest variances. An optimal ML model corresponds to the model that generates the minimal number of reduced dimension metrics needed to explain a significantly high enough total variance. For example, an optimal model may be able to explain close to 100% of the variances by retaining a few reduced dimension metrics, whereas another model may require more reduced dimension metrics to explain the variances or may be explain only 50% of the variance. Thus, the optimal model can be selected by the model selection engine 316 balancing the information loss due to the difference in total variance against the number of reduced dimension metrics, for example, by minimizing the information loss while at the same time selecting the minimal number of reduced dimension metrics to return the optimal, most effective model. According to some implementations, the model selection engine 316 may automatically select an optimal model 320 according to the training parameters upon completion of operation 430.

Generally, the number of reduced dimension metrics and the information loss are inversely related because as the number of reduced dimension metrics considered increases, the information loss decreases. However, as the number of reduced dimension metrics increases (e.g., as the number of reduced dimension metrics approaches the number of raw performance metrics), computational resources used for run time inference and or prediction are negatively impacted, thus reducing the gains in reduction of capital and operating expenses gained by the ML algorithm. For example, at the production run-time phase, where anomalies can be detected, if an anomaly detection engine is applied to 150 raw physical metrics, the detection engine will consume a lot of hardware resources (e.g., CPU, RAM, etc.) and may have a long computational duration. Whereas, if an anomaly detection engine (such as detection engine 334) is applied to on three reduced dimension metrics, the engine will consume less hardware resources and will have less computational duration.

Figure 5:
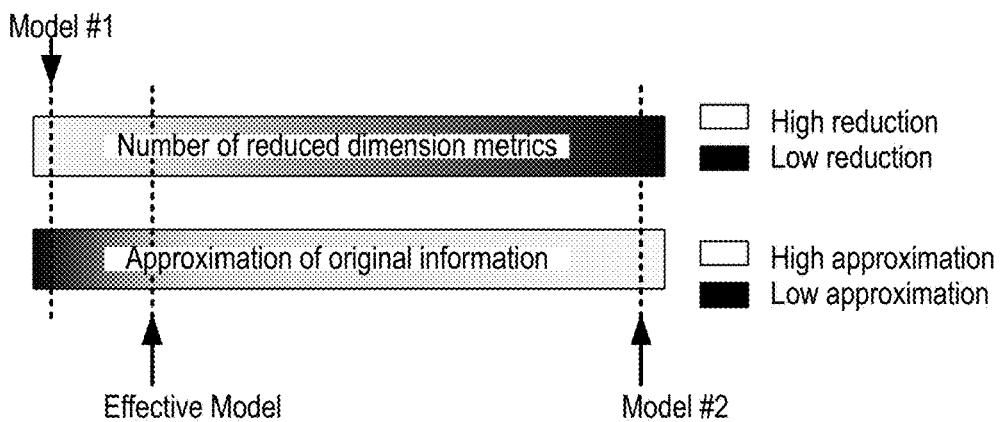
FIGS. 5-7 depict schematic visualization representations dimension reduction and feature engineering machine learning model selection in accordance with implementations of the disclosed technology.
Figure 6:
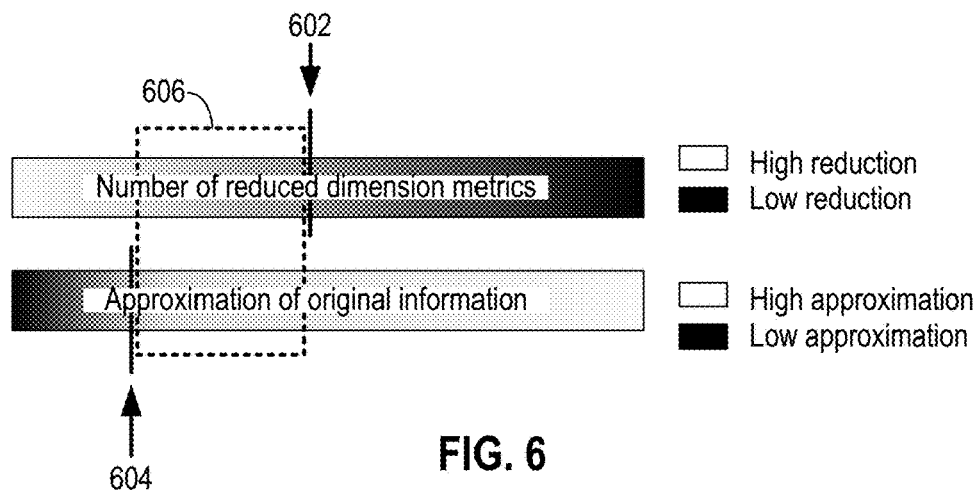
Figure 7:
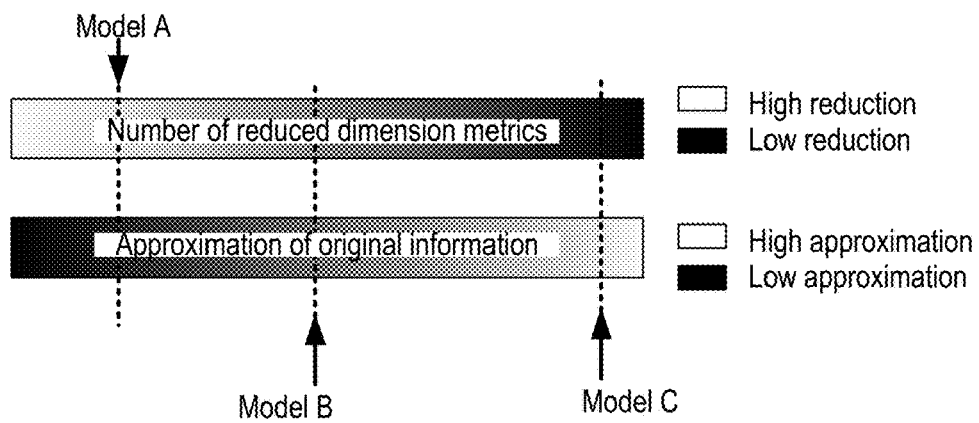

FIGS. 5-7 depict schematic visualization representations an optimal dimension reduction ML model selection, for example, by the model selection engine 316, according to implementations of the disclosed technology. FIGS. 5-7 each illustrate numbers of reduced dimension metrics for a plurality of dimension reduction ML models plotted in a first, upper horizontal bar as a greyscale gradient and replication accuracy indicators for the plurality of dimension reduction ML models plotted as a second, lower horizontal bar as a greyscale gradient. In the first, upper horizontal bar, the greyscale gradient depicts a small number of reduced dimension metrics (e.g., high reduction) as white, a large number of reduced dimension metrics (e.g., low reduction) as black, and gradually changes color from left to right in proportion with an increase in number of reduced dimension metrics. The second, lower horizontal bar represents a high accuracy (e.g., high approximation) as white, low accuracy (e.g., low approximation) as black, and gradually changes color from left to right in proportion with an increase in accuracy of the approximation. As noted above, approximation may be correlated with the total explained variance.

With reference to FIG. 5, an optimal model (e.g., an effective model) is depicted that optimizes both the number of reduced dimension metrics and the approximation accuracy or total explained variance. For example, the model selection engine 316 locates an optimal model through balancing both criteria to identify a model that provides as few reduced dimension metrics as needed, while retaining sufficiently high accuracy, to correctly characterize the behavior of the system being monitored. As illustrated in FIG. 5, a model #1 may generate a fewer number of reduced dimension metrics, but the accuracy provided by the fewer reduced dimension metrics is very poor. Thus, model #1, while providing savings in consumption of computation resource, would be poor for predicting behavior and/or inferring anomaly events from unlabeled data. Conversely, model #2 may have very good accuracy, but almost no reduction in the number of metrics as compared to the number of raw performance metrics. Thus, model #2, while providing accurate predictions and inferences, would provide minimal gains in computation resources through dimensionality reduction techniques.

FIG. 6 illustrates the same horizontal bars as FIG. 5 and includes upper bound threshold 602 and lower bound threshold 604 defining a window 606 of candidate dimension reduction ML models. As shown in FIG. 6, the upper bound threshold 602 on the number of reduced dimension metrics and the lower bound threshold 604 on the approximation accuracy may be set to constrain the selection by identifying candidate models based on a desired accuracy and a desired reduction in metrics. As noted above, different levels of accuracy may be sufficient to deem a particular model an accurate replication of the behavior of an NF. Thus, if lower accuracy is acceptable, the number of reduced dimension metrics may be reduced. Similarly, different consumption levels of computation resources for processing metrics may depend on network operators and/or CSP systems (e.g., such as assurance engine 206 of FIG. 2), which may ease up on constraints on the number of metrics and facilitating higher accuracy if so desired.

FIG. 7 depicts a scenario where an optimal (e.g., non-effective) dimension reduction ML model cannot be identified. This may be the case when the raw performance metrics applied to the ML algorithm 308 are not correlated with each other (e.g., behavior in time-series metrics did not fluctuate or change in a way that could be correlated together). That is, the original raw metrics cannot be reduced to a smaller subset of reduced dimension metrics, explaining the behavior of an NF with sufficient accuracy, through selection of a total explained variance in the reduced dimension metrics less than the total variance exhibited by the physical metrics. Thus, as shown in FIG. 7, none of models A, B, or C return acceptable accuracy with an acceptable number of reduced dimension metrics. Model A provides very low approximation, model B provides only medium reduction and medium approximation, and model C provides minimal to no reduction in metrics.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms also encompass making or achieving performance as good or effective as possible or practical under the given circumstances or making or achieving performance better than that which can be achieved with other settings or parameters. For example, as outlined above, optimal may refer to a balancing of multiple performance indicators to achieve performance as good or as effective as possible under given circumstances.

Returning to FIG. 3, the model selection engine 316 may rank the dimension reduction ML models 312 based on scoring of the models to facilitate selection of the optimal model 320. In one example, the model selection engine 316 may rank the models 312 according to the number of reduced dimension metrics generated, for example, from the fewest number to the largest number. In another example, the model selection engine 316 may rank the models 312 according to replication accuracy indicator, for example, from highest replication accuracy to lowest replication accuracy. In yet another example, the models 312 can be ranked based on both criteria (e.g., first according to number of reduced dimension metrics and second according to accuracy, or vice versa) to identify a highest ranked model. The highest ranked model may be selected as the optimal model 320. In another case, a subset of the highest ranked models 312 can be presented to a network operator via a selection GUI 318 and the operator may select a model from the subset as the optimal model 320.

In some implementations, as alluded to above, the accuracy indicator may be based on concepts "fraction of total explained variance" to return a percentage of the total variance (e.g., amount of original information that is represented in the reduced dimension metrics) that a given model 312 was able to explain using the reduced dimension metrics generated by the model over the total number of variances in the training data (referred to herein as total explained variance). For example, spectral decomposition theorem ensures that an orthonormal basis can be found for a given variance-covariance matrix, as the variance-covariance matrix is positive semi-definite and symmetric. The eigenvalues of the variance-covariance matrix are real. The eigenvalues, or variances, in the orthonormal basis are essentially a linear combination of the variances in the original physical space. The coefficients for each of the variances in the physical space are determined by the dot product of the eigenvectors of the variance-covariance matrix. Using the eigenvectors of the variance-covariance matrix and their respective dot products, it is possible to express the variance of a reduced dimension metric, as a linear combination of the associated physical raw metrics variances multiplied by their respective coefficients.

Upon selection of an optimal model (selected model 320), the operationalization phase 324 can commence. The operationalization phase can be effectuated by operationalization functions that serve to deploy the reduced dimension metric engine 328 comprising active model 330 on production run-time machines, reflecting the model 320 selected during the design phase using a deployment API 326. For example, data sources 302 may input data streams (e.g., recent unlabeled raw performance metrics 327 from data source 302) to the API server (which may be using the Representational state transfer (REST) architecture or a remote procedure call (RPC) client). In return, the API server may output reduced dimension metrics 332, in near real-time, based on the active model 339. Example production run-time machines include physical instances of NFs that are virtualized and/or containerized, for example, as resources of the infrastructure 104. As another example, a production run-time model may be implemented in assurance engine 206 (for example, as a cloud-based instance), that receives current raw metrics for infrastructure 104 via data bus 208 and outputs reduced dimension metrics 332.

Once such production run-time machines or models are operationalized, they can operate, collectively, as a detection engine 334 that may analyze incoming reduced dimension metrics 332 according to/using the production run-time machines/models to detect anomaly events in the reduced dimension space and predict and/or infer upcoming or future service degradation and/or outages in the high dimension space. Upon predicting such future service degradation/outages, inference engine 340 may output warning signals in the form of anomaly events in advance of the predicted service degradation/outages. A detection GUI 336 may be provided to allow network operators to review reduced dimension metrics 332 and retrieve correlated input raw metrics. That is, a network operator may utilize GUI 336 to transform the low dimension metrics back to high dimension metrics that correspond to physical performance metrics of the NFs.

While in the high dimension space, the detection engine 334 can rank high dimension metrics according to importance of each input high dimension metric to a detected anomaly event and isolate those metrics causing the anomaly. For example, the detection engine 334 can determine a correlation measurement between each input raw metric and each reduced dimension metrics and rank the input metrics according to contribution to anomaly events. Metrics can be ranked from most contribution to the least contributing. For example, contribution of each input metric can be determined through exploitation of the spectral decomposition theorem, where the impact of the high dimension metrics on one or more reduced dimension metrics can be ranked by order of impact and/or contribution to the anomalous event. For example, the high dimension metrics can be ranked according to a linear relationship between variances of physical dimensions (e.g., high dimensionality space) and variance of the reduced dimensions. A subset containing the highest ranked input metrics can be isolated and retrieved, thereby transforming the anomaly event (which was detected in the reduced dimension space) into the high dimension space. Upon transforming back to the high dimension space, the detection engine 334 can predict and/or infer upcoming or future service degradation and/or outages in the high dimension space.

Moreover, the production run-time machines/models (e.g., active model 339) may, over time, lose prediction accuracy and/or physical equipment may be updated (e.g., software therein and/or replacement of components). Accordingly, in some implementations, system 300 may retrain and select an optimal model via repetition of the design phase using updated historical raw performance metrics, which may be more recent metrics than the active model 330 was trained on. That is, with any machine learning model, changes in precision and accuracy of the prediction or inference can occur over time. When the precision and accuracy of the model do not relate well, within a margin of pre-defined acceptable errors, that model may require recalibration, or go through the discovery and operationalization phases again. This enables a new model to be generated that reflects reality better, and produces prediction, or inferences, that are more meaningful and useful. It should be noted that similar to the closed-loop aspect described above (closed loop actions 206a), such an implementation of various embodiments also results in a closed-loop implementation between the design and production run-time phases.

FIG. 8 is an example visualization of dimension reduction ML models ranked according to total explained variance in accordance with implementations of the disclosed technology. The visualization is provided as table 800 comprising entries for a subset of dimension reduction ML model, such as a subset of dimension reduction ML models 312. The subset may represent a number (e.g., 5 in this example) of the highest ranked models, as described above. The table 800 may be generated, for example, on a selection GUI 318 of the model selection engine 316 and presented to a network operator for review and/or selecting an optimal model.

Each entry of table 800 corresponds to one of the plurality of trained dimension reduction ML models, which populate a model entry 805. For each entry, a minimum total explained variances entry 810 is populated, for example, according to a lower bound threshold. A maximum number of reduction dimension metrics entry 820 is populated, for example, according to an upper bound threshold. The upper and lower bound thresholds may be set, for example, based on user input into the training GUI 310. Also, a number of input raw metrics entry 830 is populated, for example, with the number of raw metrics retrieved from the historical database 304 and used to train each respective model. Bounded box 860 encompasses the outputs for each model, which includes total explained variance entry 840 and number of reduced dimension metrics entry 850 used to explain the variances indicated in entry 840.

As shown in FIG. 8, based on the rankings, model #1 in this example provides both high accuracy (e.g., 99.5% total explained variances) using moderate reduction (e.g., 10 reduced dimension metrics reduced from the original 68). Compared to model #5 which provides both high accuracy (e.g., 95.2% total explained variances) using high reduction (e.g., 3 Reduced dimension metrics reduced from the original 68). Thus, the model selection engine 316 can automatically select the highest ranked model, or a user may select the model for deployment on production run-time machines as described above.

Figure 9:
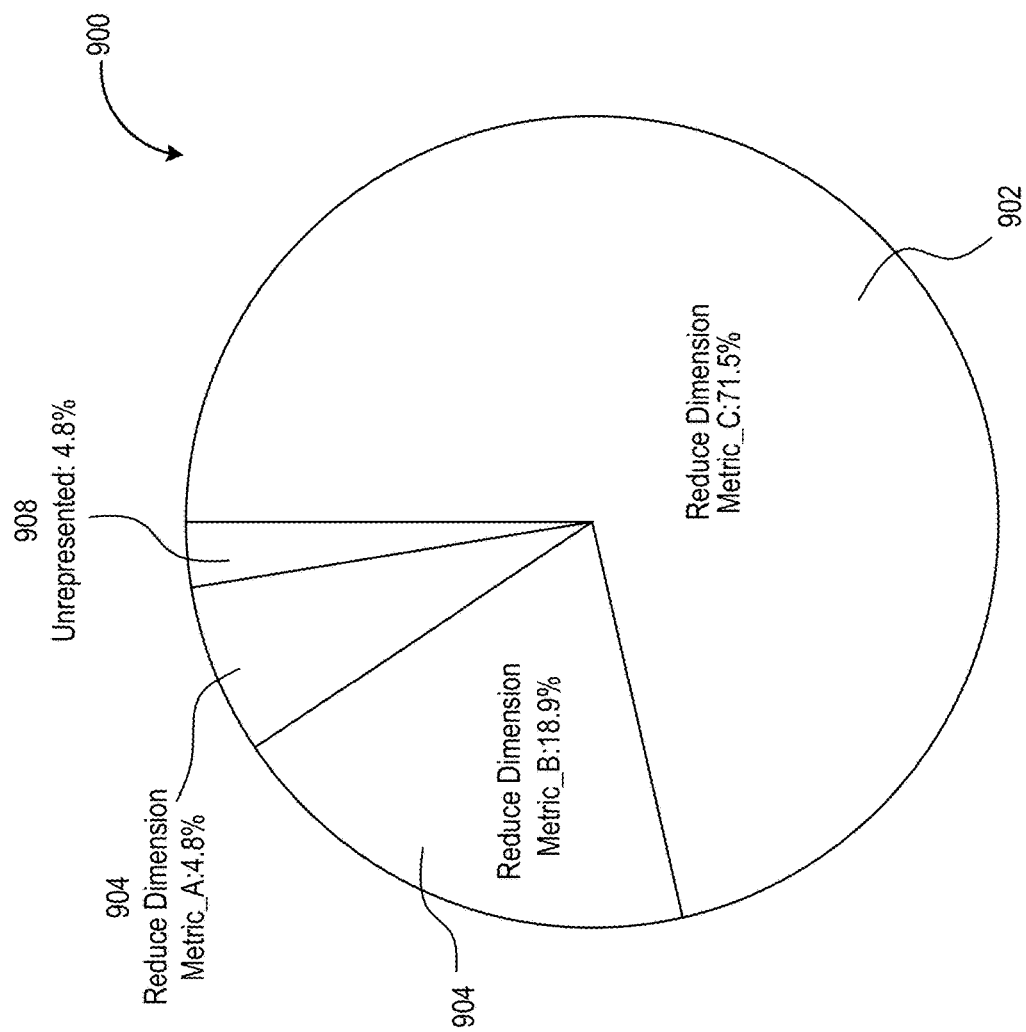
FIG. 9 is a graphical representation of reduced dimension metrics provided by a dimension reduction ML model according to an example implementation of the disclosed technology.

FIG. 9 is a graphical representation of reduced dimension metrics provided by a dimension reduction ML model according to an example implementation of the disclosed technology. The graphical representation is illustratively shown as a pie chart 900 divided into reduced dimension metrics, generated by an example dimension reduction ML model (e.g., one of models 312) based on input raw metrics, where the percentage represents the number of variances explained by the reduced dimension metrics. In the illustrative example of FIG. 9, the dimension reduction ML model generated reduced dimension metrics A-C. First reduced dimension metric A was able to explain 71.5% of the variances of the input metrics; second reduced dimension metric B was able to explain 18.9% of the variances of the input metrics, and third reduced dimension metric C was able to explain 6.8% of the variances of the input metrics. A remaining 2.8% of variances were unrepresented (e.g., unexplained) by the model. Thus, the example model used to generate pie chart 900 was able to explain 97.2% of the variances using three reduced dimension metrics.

In one example, the pie chart 900 may be generated by the selection GUI 318 as part of selecting an optimal model, for example, where a network operator may wish to further explore the performance of the model. In this case, the input data would correspond to historical raw metrics. In an illustrative example, model #5 of FIG. 8 was used to generate pie chart 900.

In another example, pie chart 900 may be generated by, for example, a detection GUI 336 using reduced dimension metrics 332. For example, after selecting a model and deploying the model and production run-time machines, the active model may generate reduced dimension metrics 902-906.

Figure 10:
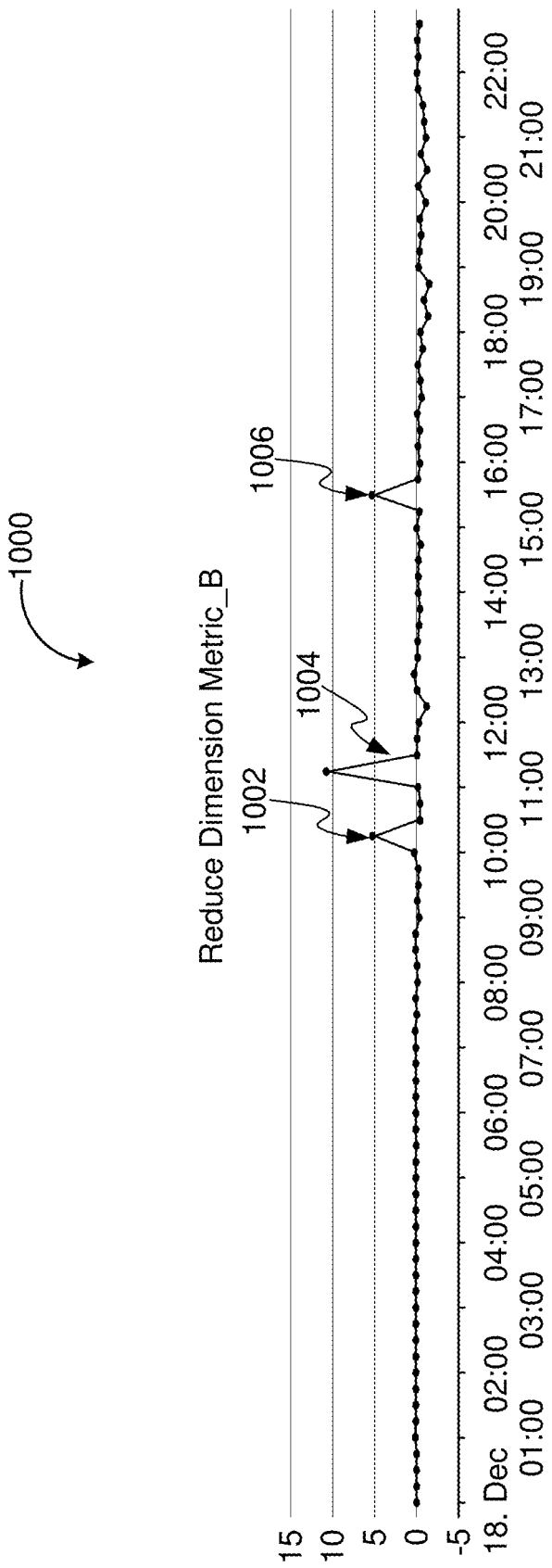
FIG. 10 is a graphical representation of an example reduced dimension metric as time-series data according to an example implementation of the disclosed technology.

FIG. 10 is a graphical representation of an example reduced dimension metric according to an example implementation of the disclosed technology. FIG. 10 depicts a line graph 1000 of example reduced dimension metric B described above in relation to FIG. 9. For example, from pie chart 900, a time series graphical representation of each reduced dimension metric can be retrieved. The reduced dimension metric B is plotted as time-series data, with time in hours on the x-axis and a normalized, unitless magnitude on the y-axis. The magnitude is unitless as a result of the transformation to the low dimension space, which results in values that are not directly relatable to physical properties. In the low dimension space, a value of 0 represents ideal operating situation, and deviations from zero may correspond to variances (or abnormal events). While there are numerous variances from 0, three large variances are shown (variances 1002-1006). In some implementations, where the detection engine 334 detects a variance that exceeds a threshold magnitude, which may be set as desired (for example, 5 in this case), the detection engine 334 generates a warning signal, which can be presented to a network operator via detection GUI 336 (see FIG. 13 discussed below).

In an example implementation, from pie chart 900 presented on a GUI, a network operator can interact with a reduced dimension metric as presented on pie chart 900 to retrieve graphical representation 1000. For example, network operator may select a portion of pie chart 900 corresponding to reduced dimension metric B (or an icon representing the reduced dimension metric), which causes the detection engine 334 to retrieve time-series data of the selected metric and present the metric as graphical representation 1000 via GUI 338.

Figure 11:
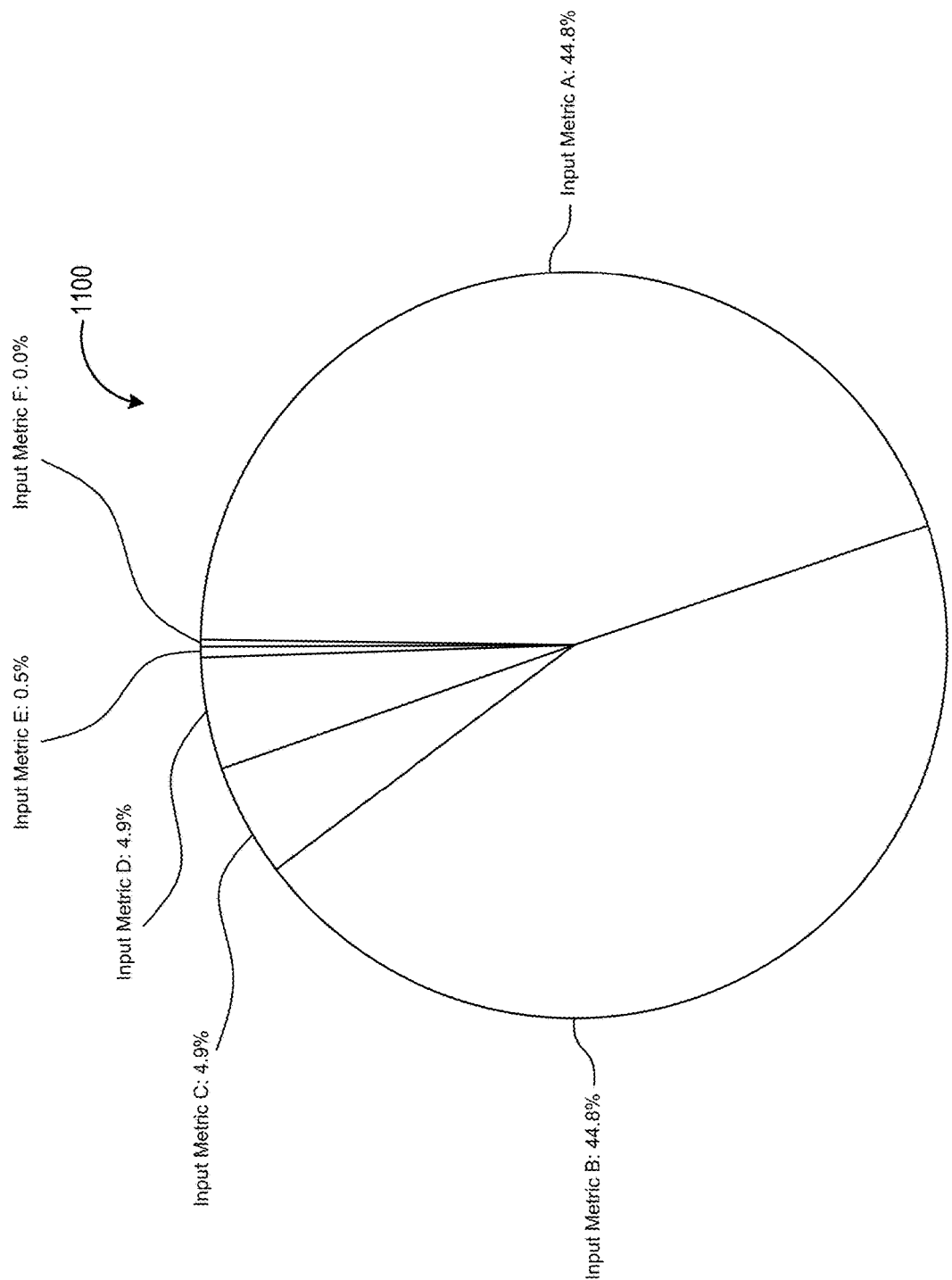
FIG. 11 is a graphical representation of input raw metrics correlated to the example reduced dimension metric of FIG. 10 according to an example implementation of the disclosed technology.

FIG. 11 is a graphical representation of input raw metrics correlated to the example reduced dimension metric of FIG. 10 according to an example implementation of the disclosed technology. The graphical representation is illustratively shown as a pie chart 1100 divided into input raw metrics A-F that are correlated with, for example, the reduced dimension metric B of FIG. 10, where the percentage represents a percentage of contribution or importance of each input metric A-F to the reduce dimension metric B. In the illustrative example of FIG. 11, the input raw metrics A-F represent at least some of the raw metrics input into a dimension reduction ML model to generate reduce dimension metrics A-C of FIG. 9. As described above, the input metrics are ranked according to contribution, and a number of the highest ranked input metrics can be isolated and displayed as pie chart 1100.

In one example, the pie chart 1100 may be generated by the selection GUI 318 as part of selecting an optimal model, for example, where a network operator may wish to further explore the performance of the model. In this case, the input raw data would correspond to historical raw metrics.

In another example, pie chart 900 may be generated by, for example, a detection GUI 336 using reduced dimension metrics 332. For example, input raw metrics A-F were applied to active model 330 at reduced dimension metric engine 328, which was generated reduced dimension metric B above.

Figure 12:
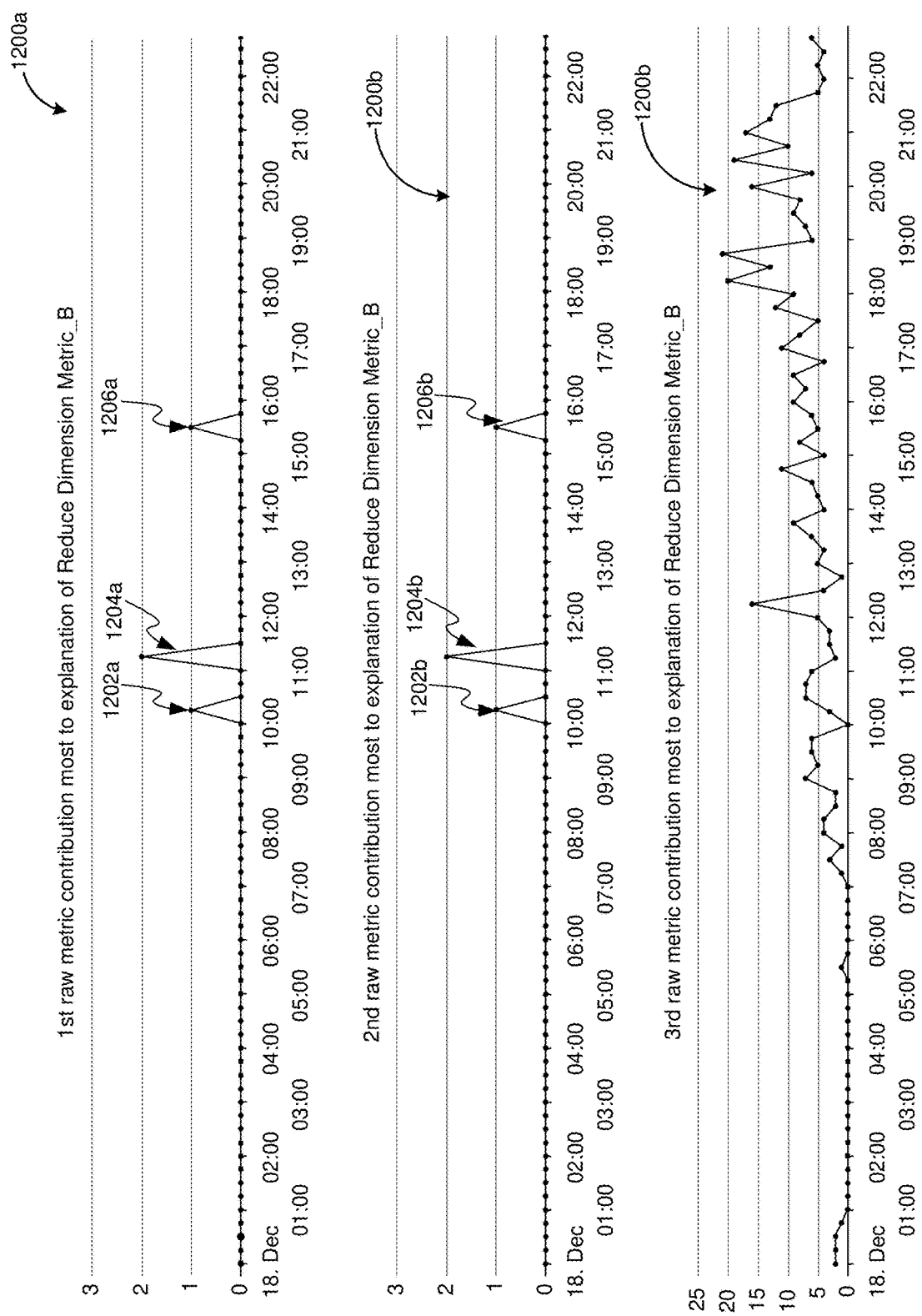
FIG. 12 is graphical representations of example input raw metrics the input raw metrics of FIG. 11 as time-series data according to an example implementation of the disclosed technology.

FIG. 12 depicts graphical representations of example input raw metrics that are highly correlated with a reduced dimension metric according to an example implementation of the disclosed technology. FIG. 12 depicts line graphs 1200*a-c* corresponding to input raw metrics A-C from pie chart 1100. For example, each line graph 1200*a-c* is a time series representation of each input raw metric that can be retrieved via pie chart 1100. The input raw metrics shown in FIG. 12 are plotted as time-series data, with time in hours on the x-axis and a normalized, unitless, scaled magnitude on the y-axis. In some implementations, if a graphical representation of the input raw metric is in standardized form (e.g., with zero mean and unit variance), then the y-axis can be dimensionless as shown in FIG. 12. Alternatively, if the graphical representation shows the input raw metric as detected by a data source, then y-axis is not dimensionless and includes the unit/dimensions of the input raw metric. Network operators are used to seeing the input raw metric as is with the associated units/dimensions because they are able to relate to it better.

FIG. 12 (and FIG. 11) illustrates a visualization of transformation from the low dimension space visualized in FIGS. 9 and 10 back to the high dimension space. For example, having detected the anomaly events of FIG. 10, the reduced dimension metric can be transformed back to the high dimension input metrics that contribute the most to the anomaly event for analysis and processing in a known, physical space that can be understood by the detection engine 334 and/or operator. In the physical space, the predictions and inferences of future service degradation and/or outages can be made from understandable, physical metrics. For example, upon transforming to the high dimension space, anomaly event 1202*a* can be correlated with anomaly event 1202*b* as a result of detection anomaly event 1002 in the low dimension space. Similarly, anomaly event 1204*a* can be correlated with anomaly event 1204*b*, and 1206*a* with 1206*b*. In some cases, such correlation would not have been possible without the reduced dimension space and ML models of the disclosed technology. For example, metric A and metric B may be provided by NFs from different vendors, which may be proprietary metrics and/or not directly comparable. However, through the reduced dimension metrics a correlation can be made that provides increased insight potential service degradation and failures, which may be address early by network operators.

Figure 13:
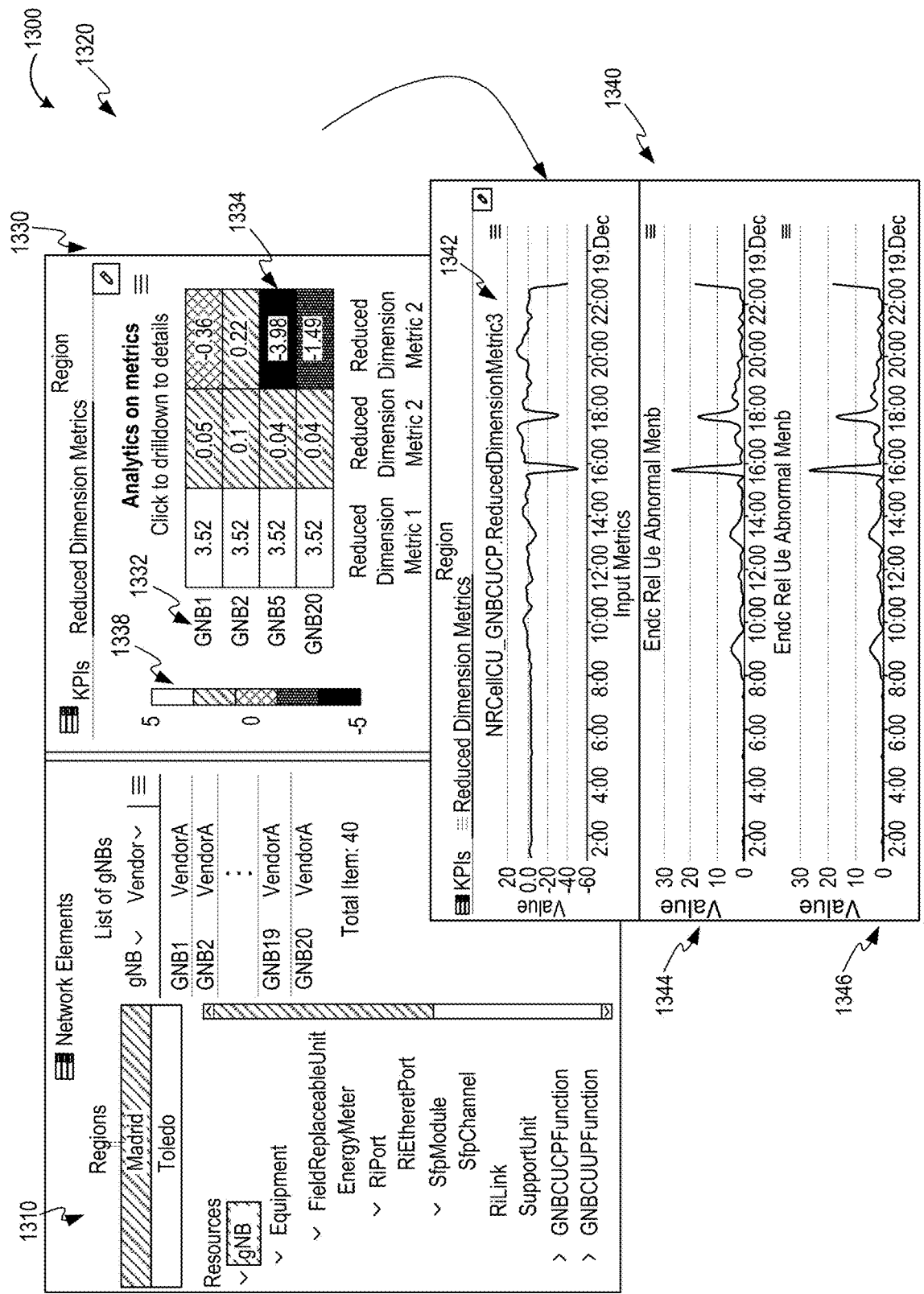
FIG. 13 is an example visualization of a graphical user interface for anomaly detection using dimension reduction ML models according to implementations of the disclosed technology.

FIG. 13 is an example visualization of a GUI for anomaly detection using dimension reduction ML models according to implementations of the disclosed technology. FIG. 13 illustrates an example of detection GUI 338 of the detection engine 334 that may be used to drill down into a warning signal generated by the detection engine 334.

A first panel 1310 of the GUI may present network elements, for example, regions of the network, listing of resources providing network services, and a list of NFs displayed responsive to interacting with the listing of resources. In the example of FIG. 13, NFs are gNBs of a 5G network, each of which are provided by VendorA. It will be appreciated that the list of NFs may be more numerous than illustratively shown in FIG. 13.

A second panel 1320 of the GUI may display, for a given region, graphical icons (e.g., boxes of various colors) of warning indicators for each reduced dimension metric (e.g., reduced dimension metrics 1-3) for each VNF and/or CNF 1332 in a first screen 1330. In the illustrative example of FIG. 13, the VNF/CNFs 1332 are gNBs; however, the present disclosure is applicable to any NF, whether PNF, VNF, and/or CNF or from any domain of the network. Where the indicator for a reduced dimension metric satisfies a set criteria, a graphical icon of the indicator may be displayed indicating that no anomaly is detected (e.g., white colored graphical icons of FIG. 13). In some examples, the criteria or threshold value can be calculated by applying statistical techniques, such as fitting the closest probability distribution, usually a normal distribution, to the data and then selecting an appropriate percentile. More sophisticated statistical methods can also be applied. Where the indicator of a reduced dimension metric is within an acceptable range of the set criteria, a graphical icon of the indicator may be displayed indicating that no anomaly event is detected, but that performance is less than ideal (e.g., hatched colored graphical icons, where hatching indicates varying degrees from the set metric as indicated by legend 1338). Where the indicator of the reduced dimension metric is less than or greater than the pre-configured threshold, the graphical icon of the indicator may be displayed indicating that an anomaly is detected (e.g., black colored graphical icons).

A network operator may interact with any graphical icon to review details of the reduced dimension metric and highly correlated input metrics. For example, in the case of icon 1334, where a network operator may wish to drill deeper into the detect anomaly, a user may select (e.g., click, tap, etc.) the icon to bring up a second screen 1340. The second screen may replace, be overlaid, or otherwise displayed in front of screen 1330. Screen 1340 may display a graphical representation of the reduced dimension metric 1342 of the selected icon (e.g., reduce dimension metric 3 in this example) and one or more correlated input metrics 1344-1346 that contributed the most to the reduced dimension metric (e.g., two input metrics in this example). The reduced dimension metric 3 may be displayed as a pie chart, such as pie chart 900, and/or a time-series graphical representation, such as graphical representation 1000. The input metrics 1344-1346 may be displayed as in a pie chart, such as pie chart 1100, and/or a time-series graphical representation, such as graphical representations 1200*a*-1200*c*. This can be very useful for network operators because to understand the nature of the problem, for example needed for triage, the operator need only focus only on the correlated input metrics out of the numerous input metrics received and used to generate the reduced dimension metrics.

Figure 14:
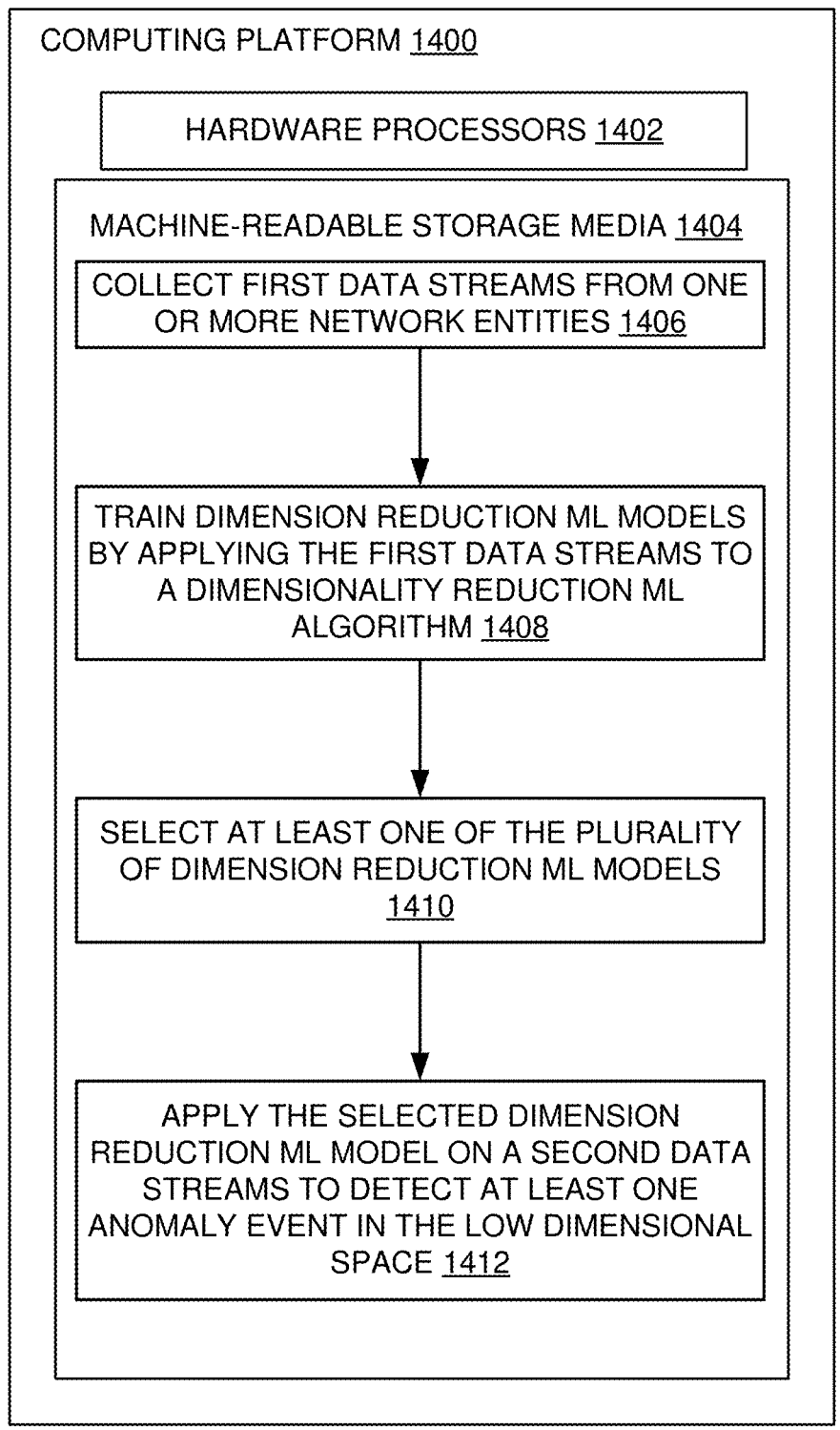
FIG. 14 is an example computing component that may be used to implement various features of dimensionality reduction and anomaly detection in accordance with the implementations disclosed herein.

FIG. 14 illustrates an example computing component that may be used to implement dimensionality reduction and anomaly detection in accordance with various embodiments. Referring now to FIG. 14, computing component 1400 may be, for example, a server computer, a controller, or any other similar computing component capable of processing data. In the example implementation of FIG. 14, the computing component 1400 includes at least one hardware processor 1402, and at least one machine-readable storage medium for 1404.

Hardware processor 1402 may be one or more central processing units (CPUs), semiconductor-based microprocessors, and/or other hardware devices suitable for retrieval and execution of instructions stored in machine-readable storage medium 1404. Hardware processor 1402 may fetch, decode, and execute instructions, such as instructions 1406-1412, to control processes or operations for burst preloading for available bandwidth estimation. As an alternative or in addition to retrieving and executing instructions, hardware processor 1402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1404, may be any electronic, magnetic, optical, or other physical storage device that contains or stores executable instructions. Thus, machine-readable storage medium 1404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1404 may be a non-transitory storage medium, where the term "non-transitory" does not encompass transitory propagating signals. As described in detail below, machine-readable storage medium 1404 may be encoded with executable instructions, for example, instructions 1406-1412.

Hardware processor 1402 may execute instruction 1406 to collect a first plurality of data streams from one or more network entities, each first data stream representative of a first physical performance metric. For example, as described above, data sources may be, for example data sources 302 and/or one or more resources servicing a 5G network, certain physical and/or virtual resources implemented on infrastructure 104, may provide data streams in the form of time-series physical performance metrics to a historical database (e.g., database 304 of FIG. 2).

Hardware processor 1402 may execute instruction 1408 to train a plurality of dimension reduction ML models by applying the first data streams to a dimensionality reduction ML algorithm. For example, a plurality of dimension reduction ML models can be trained, tested, and/or validated by applying a dimensionality reduction ML algorithm, as described herein to data streams in high dimensional space (e.g., data streams or raw physical metrics), which are archived and/or stored in a database. As described above in relation to FIG. 3, the plurality of dimension reduction ML models transform the first plurality of data streams from high dimensional space to low dimensional space by generating a number of reduced dimension metrics. The plurality of dimension reduction ML models also replicate operational behavior of the one or more network entities using the reduce dimension metrics. As explained above, each of the plurality of dimension reduction ML models reduces the first plurality of data streams to a respective number of reduced dimension metrics with a respective accuracy indicator.

Hardware processor 1402 may execute instruction 1410 to select at least one of the plurality of dimension reduction ML models by identifying a dimension reduction ML model that minimizes the respective number of reduced dimension metrics and maximizes the respective accuracy indicator. For example, as described above in relation to FIGS. 3-8, an optimal model can be selected by balancing the number of reduced dimension metrics against the accuracy of the replication, to provide a model that can generate significantly fewer metrics (as compared to the first data streams) while replicating the operational behavior of the network entities.

Hardware processor 1402 may execute instruction 1412 to apply the selected dimension reduction ML model on a second plurality of data streams to detect at least one anomaly event in the low dimensional space. The second plurality of data streams representative of second physical performance metrics, for example, recent performance metrics from data sources. The selected dimension reduction ML model generates reduced dimension metrics for the second plurality of data streams and detects at least one anomaly event in at least one of the reduced dimension metrics, as described above in relation to FIGS. 3 and 9-13. For example, the selected dimension reduction ML model is applied to an incoming second plurality of data streams in real time. An anomaly event is generated when an anomaly is detected in the lower dimensional data obtained by applying the selected dimensionality reduction ml model on the incoming second plurality of data steams. Furthermore, upon detecting the anomaly event, the at least one reduced dimension metric can be reverted back to the high dimension space, by transforming from the reduced dimension metric back to correlated second physical performance metrics based on determining a fractional contribution of each second physical performance metric to the at least one reduced dimension metric (e.g., fraction of explained variance), in which the anomaly event was detected.

Figure 15:
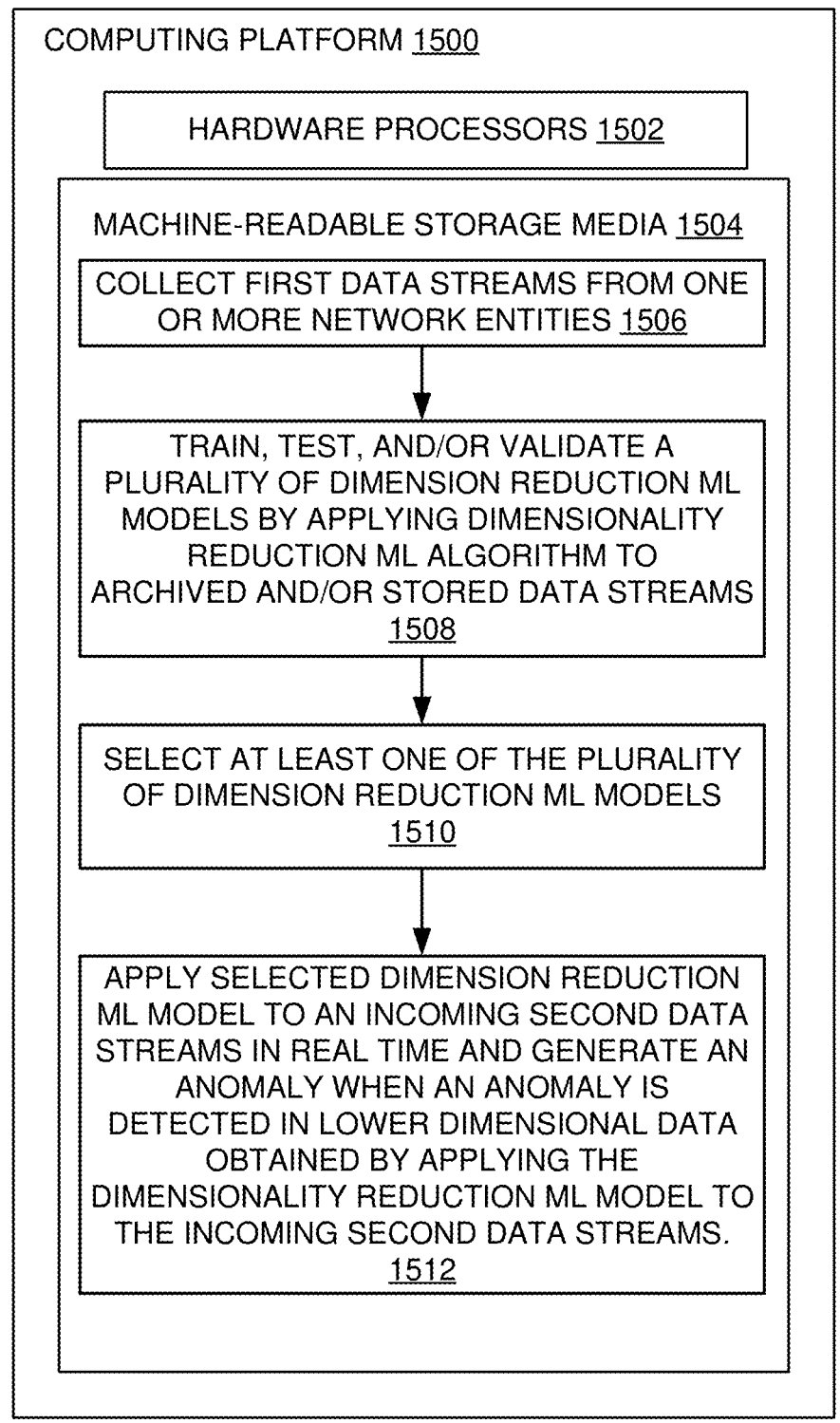
FIG. 15 is another example computing component that may be used to implement various features of dimensionality reduction and anomaly detection in accordance with the implementations disclosed herein.

FIG. 15 illustrates another example computing component that may be used to implement dimensionality reduction and anomaly detection in accordance with various embodiments. Referring now to FIG. 15, computing component 1500 may be, for example, a server computer, a controller, or any other similar computing component capable of processing data. In the example implementation of FIG. 15, the computing component 1500 includes at least one hardware processor 1502, and at least one machine-readable storage medium for 1504.

Hardware processor 1502 may be one or more central processing units (CPUs), semiconductor-based microprocessors, and/or other hardware devices suitable for retrieval and execution of instructions stored in machine-readable storage medium 1504. Hardware processor 1502 may fetch, decode, and execute instructions, such as instructions 1506-1512, to control processes or operations for burst preloading for available bandwidth estimation. As an alternative or in addition to retrieving and executing instructions, hardware processor 1502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1504, may be any electronic, magnetic, optical, or other physical storage device that contains or stores executable instructions. Thus, machine-readable storage medium 1504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1504 may be a non-transitory storage medium, where the term "non-transitory" does not encompass transitory propagating signals. As described in detail below, machine-readable storage medium 1504 may be encoded with executable instructions, for example, instructions 1506-1512.

Hardware processor 1502 may execute instruction 1506 to collect a first plurality of data streams from one or more network entities, each first data stream representative of a first physical performance metric. Instructions 1506 may be substantially the same as instruction 1406 of FIG. 14.

Hardware processor 1502 may execute instruction 1508 to train, test, and/or validate a plurality of dimension reduction ML model by applying a dimensionality reduction ML algorithm, as described herein, to the first plurality of data streams in the high dimensional space (e.g., data streams or raw physical metrics), which are archived and/or stored in a database. For example, as described above in relation to FIGS. 3, the plurality of dimension reduction ML models transform the first plurality of data streams from high dimensional space to low dimensional space by generating a number of reduced dimension metrics.

Hardware processor 1502 may execute instruction 1510 to select at least one of the plurality of dimension reduction ML models by identifying a dimension reduction ML model that minimizes the respective number of reduced dimension metrics and maximizes the respective accuracy indicator. Instructions 1508 may be substantially the same as instruction 1410 of FIG. 14.

Hardware processor 1502 may execute instruction 1512 to apply the selected dimension reduction ML model to an incoming second plurality of data streams in real time. For example, as described in relation to FIGS. 3 and 9-14. Additionally, hardware processor 1502 may execute instruction 1512 to generate an anomaly event when an anomaly is detected in the lower dimensional data obtained by applying the selected dimensionality reduction ml model on the incoming second plurality of data steams.

Figure 16:
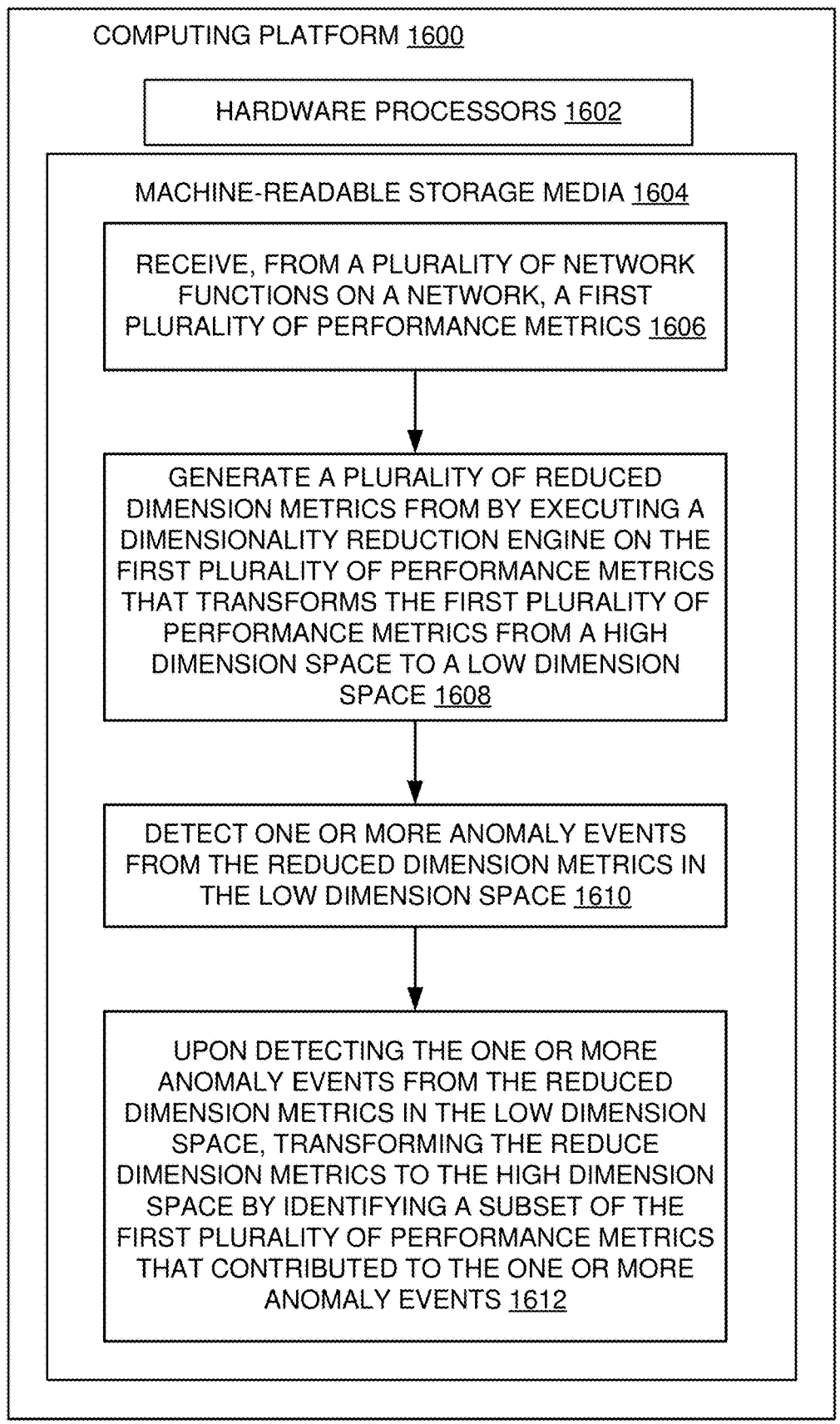
FIG. 16 is an example computing component that may be used to implement various features of anomaly detection in accordance with the implementations disclosed herein.

FIG. 16 illustrates an example computing component that may be used to implement dimensionality reduction and anomaly detection in accordance with various embodiments. Referring now to FIG. 16, computing component 1600 may be, for example, a server computer, a controller, or any other similar computing component capable of processing data. In the example implementation of FIG. 16, the computing component 1600 includes at least one hardware processor 1602, and at least one machine-readable storage medium for 1604.

Hardware processor 1602 may be one or more central processing units (CPUs), semiconductor-based microprocessors, and/or other hardware devices suitable for retrieval and execution of instructions stored in machine-readable storage medium 1604. Hardware processor 1602 may fetch, decode, and execute instructions, such as instructions 1606-1612, to control processes or operations for burst preloading for available bandwidth estimation. As an alternative or in addition to retrieving and executing instructions, hardware processor 1602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1604, may be any electronic, magnetic, optical, or other physical storage device that contains or stores executable instructions. Thus, machine-readable storage medium 1604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1604 may be a non-transitory storage medium, where the term "non-transitory" does not encompass transitory propagating signals. As described in detail below, machine-readable storage medium 1604 may be encoded with executable instructions, for example, instructions 1606-1612.

Hardware processor 1602 may execute instruction 1606 to receive, from a plurality of NFs on a network, a first plurality of performance metrics. For example, as described above, NFs may be examples of data sources 302 and the performance metrics may include, for example but not limited to, CPU utilization, memory consumption, number of bytes/octets in/out of the NF, number of packets in/out of the NF, amongst others.

Hardware processor 1602 may execute instruction 1608 to generate one or more reduced dimension metrics from by executing a dimensionality reduction engine on the first plurality of performance metrics that transforms the first plurality of performance metrics from a high dimension space to a low dimension space. For example, the dimensionality reduction engine may be implemented as reduced dimension metric engine 328 of FIG. 3.

Hardware processor 1602 may execute instruction 1610 to detect one or more anomaly events from the one or more reduced dimension metrics in the low dimension space. For example, as described above in relation to FIGS. 3 and 9-13.

Furthermore, according to some example implementations, upon detecting the one or more anomaly events from the one or more reduced dimension metrics, hardware processor 1602 may execute instruction 1612 to transform the one or more reduced dimension metrics to the high dimension space by identifying a subset of the first plurality of performance metrics that contributed to the one or more anomaly events, as described above with reference to FIGS. 3 and 11-13. For example, upon detecting the one or more anomaly events from the one or more reduced dimension metrics in the low dimensional space, the reduced dimension metrics can be mapped back to the original high dimension space (e.g., physical dimension space) by identifying the subset of the first plurality of performance metrics that contributed to the one or more anomalous events.

Accordingly, the technology disclosed herein provides numerous advantages over existing anomaly detection techniques. For example, the disclosed technology can scale up and work with on massive time-series data by processing high dimensional datasets of metrics, extracting from them a much lower number of relevant dimension in a synthetic dimension space (e.g., reduced dimension metrics). In the synthetic dimension space, anomalous behavior can be detected in near real-time by applying anomaly detection techniques to the reduced dimension metrics, and then revert the reduced dimension metrics back to the physical, high dimension space for ease of consumption and understanding by network operators. The technology disclosed herein enables smarter 5G network operations by displaying "intelligent" signals triggered by the anomaly detection engine, which alerts network operators, who can then drilldown into the specific reduced dimension metrics for deeper troubleshooting. For example, by correlating high dimension metrics with the reduce dimension metrics. Further, the disclosed technology is lightweight in terms of the computational resources consumed due to the reduction in metrics processed for anomaly detection, thus reducing the cost needed for deploying 5G network monitoring solutions.

Figure 18:
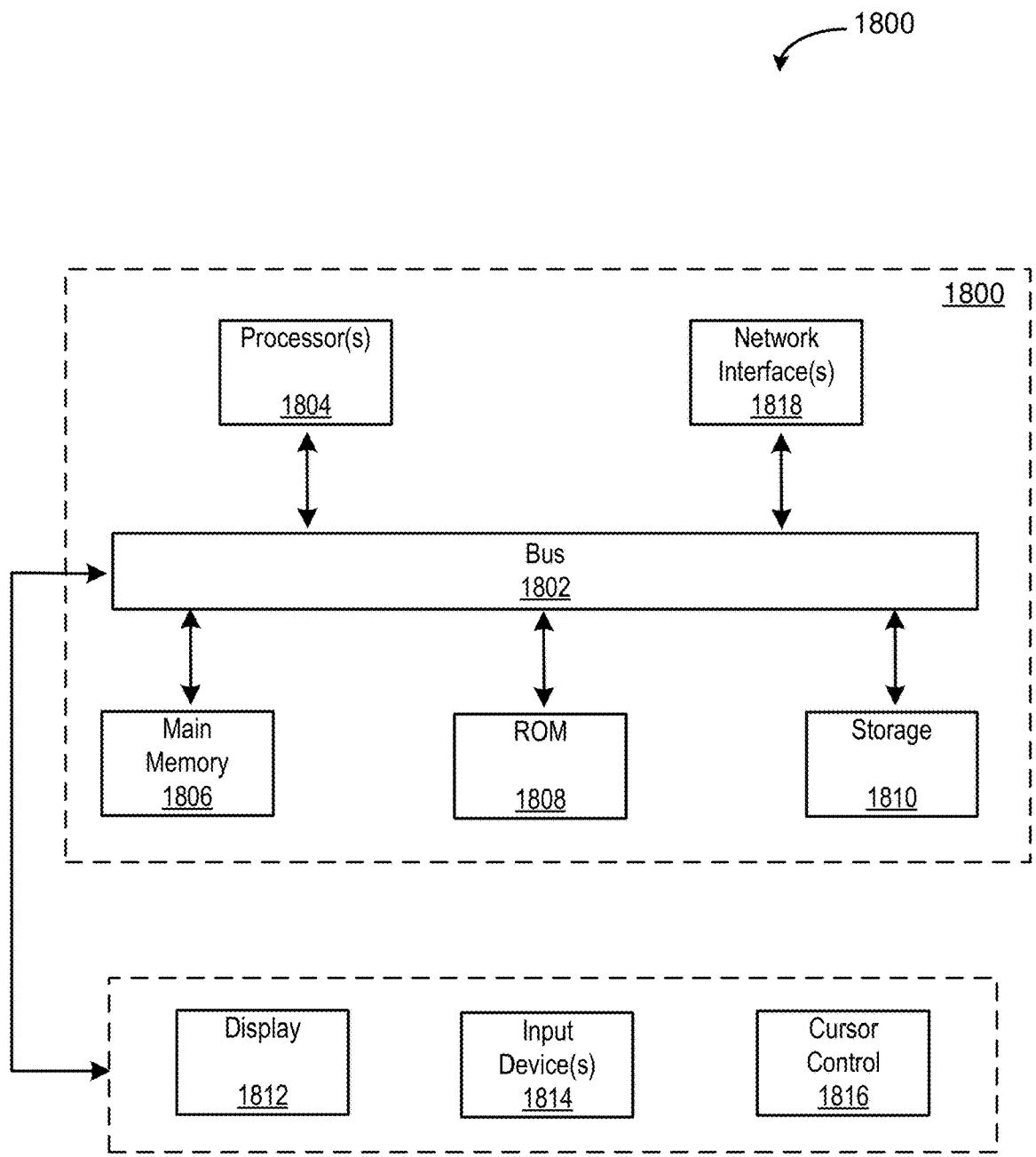
FIG. 18 is an example computer system that may be used to implement various features of dimensionality reduction and anomaly detection of the present disclosure.

FIG. 18 depicts a block diagram of an example computer system 1800 in which dimensionality reduction and anomaly detection, according to the technology described herein, may be implemented. The computer system 1800 includes a bus 1802 or other communication mechanism for communicating information, one or more hardware processors 1804 coupled with bus 1802 for processing information. Hardware processor(s) 1804 may be, for example, one or more general purpose microprocessors. The computer system 1800 may implement one or more of the components of system 300.

The computer system 1800 also includes a main memory 1806, such as a random access memory (RAM), cache and/or other dynamic storage devices, coupled to bus 1802 for storing information and instructions to be executed by processor 1804. Main memory 1806 also may be used for storing temporary variables or other intermediate information during execution of instructions to be executed by processor 1804. Such instructions, when stored in storage media accessible to processor 1804, render computer system 1800 into a special-purpose machine that is customized to perform the operations specified in the instructions.

The computer system 1800 further includes a read only memory (ROM) 1808 or other static storage device coupled to bus 1802 for storing static information and instructions for processor 1804. A storage device 1810, such as a magnetic disk, optical disk, or USB thumb drive (Flash drive), etc., is provided and coupled to bus 1802 for storing information and instructions.

The computer system 1800 may be coupled via bus 1802 to a display 1812, such as a liquid crystal display (LCD) (or touch screen), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. In some embodiments, the same direction information and command selections as cursor control may be implemented via receiving touches on a touch screen without a cursor.

The computing system 1800 may include a user interface module to implement a GUI (such as GUIs 310, 318, and/or 336) that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Figure 17:
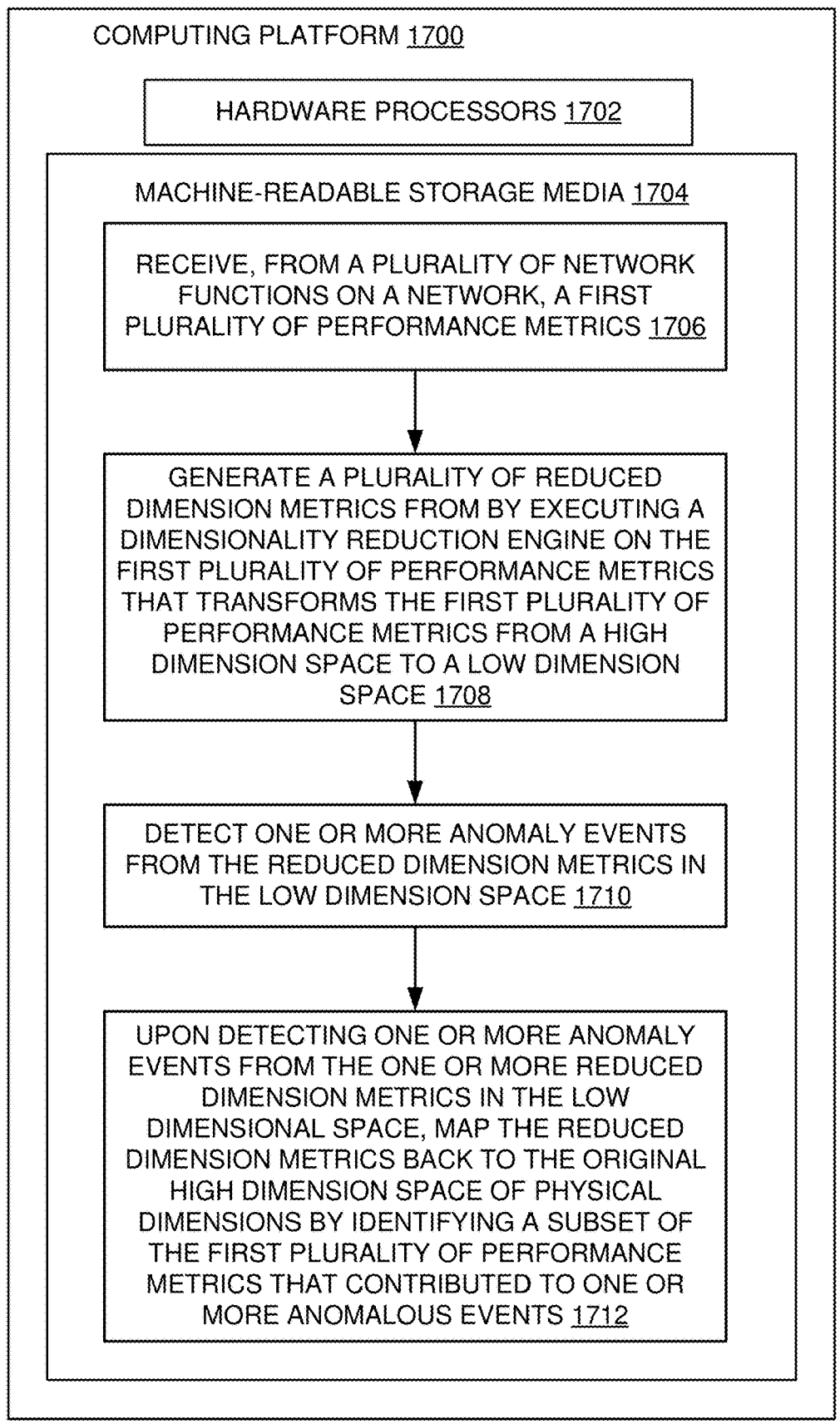
FIG. 17 is another example computing component that may be used to implement various features of anomaly detection in accordance with the implementations disclosed herein.

FIG. 17 illustrates another example computing component that may be used to implement dimensionality reduction and anomaly detection in accordance with various embodiments. Referring now to FIG. 17, computing component 1700 may be, for example, a server computer, a controller, or any other similar computing component capable of processing data. In the example implementation of FIG. 17, the computing component 1700 includes at least one hardware processor 1702, and at least one machine-readable storage medium for 1704.

Hardware processor 1702 may be one or more central processing units (CPUs), semiconductor-based microprocessors, and/or other hardware devices suitable for retrieval and execution of instructions stored in machine-readable storage medium 1704. Hardware processor 1702 may fetch, decode, and execute instructions, such as instructions 1706-1712, to control processes or operations for burst preloading for available bandwidth estimation. As an alternative or in addition to retrieving and executing instructions, hardware processor 1702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1704, may be any electronic, magnetic, optical, or other physical storage device that contains or stores executable instructions. Thus, machine-readable storage medium 1704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1704 may be a non-transitory storage medium, where the term "non-transitory" does not encompass transitory propagating signals. As described in detail below, machine-readable storage medium 1704 may be encoded with executable instructions, for example, instructions 1706-1712.

Hardware processor 1702 may execute instructions 1706-1710, each of which may be substantially the same as instructions 1606-1610 of FIG. 16. Accordingly, hardware processor 1702 may execute instructions 1706-1710 to: receive, from a plurality of NFs on a network, a first plurality of performance metrics; generate one or more reduced dimension metrics from by executing a dimensionality reduction engine on the first plurality of performance metrics that transforms the first plurality of performance metrics from a high dimension space to a low dimension space; and detect one or more anomaly events from the one or more reduced dimension metrics in the low dimension space.

Furthermore, according to some example implementations, upon detecting the one or more anomaly events from the one or more reduced dimension metrics in the low dimension space, hardware processor 1702 may execute instruction 1712 to map the reduced dimension metrics back to the original high dimension space (e.g., physical dimension space) by identifying the subset of the first plurality of performance metrics that contributed to the one or more anomalous events. For example, as explained in connection with FIGS. 3, 9-13, and 16.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1800 may implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor(s) 1804 executing one or more sequences of one or more instructions contained in main memory 1806. Such instructions may be read into main memory 1806 from another storage medium, such as storage device 1810. Execution of the sequences of instructions contained in main memory 1806 causes processor(s) 1804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1810. Volatile media includes dynamic memory, such as main memory 1806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1802. Transmission media can also take the form of acoustic or light waves, such as those generated during radio-wave and infra-red data communications.

The computer system 1800 also includes a network interface 1818 coupled to bus 1802. Network interface 1818 provides a two-way data communication coupling to one or more network links that are connected to one or more local networks. For example, network interface 1818 may be an integrated services digital network (ISDN) card, cable modem, satellite modem, or a modem to provide a data communication connection to a corresponding type of telephone line. As another example, network interface 1818 may be a local area network (LAN) card to provide a data communication connection to a compatible LAN (or WAN component to communicated with a WAN). Wireless links may also be implemented. In any such implementation, network interface 1818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local network and Internet both use electrical, electromagnetic or optical signals that carry digital data streams. The signals through the various networks and the signals on network link and through network interface 1818, which carry the digital data to and from computer system 1800, are example forms of transmission media.

The computer system 1800 can send messages and receive data, including program code, through the network(s), network link and network interface 1818. In the Internet example, a server might transmit a requested code for an application program through the Internet, the ISP, the local network and the network interface 1818.

The received code may be executed by processor 1804 as it is received, and/or stored in storage device 1810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
    collecting a first plurality of data streams from one or more network entities, the first plurality of data streams are representative of physical performance metrics comprising a plurality of variances;
    creating a plurality of dimension reduction machine learning (ML) models by applying the first plurality of data streams to a dimensionality reduction ML algorithm, each of the plurality of dimension reduction ML models transforms the first plurality of data streams from high dimensional space to low dimensional space by generating a respective number of reduced dimension metrics and determine a respective accuracy indicator by replicating operational behavior of the one or more network entities using the reduced dimension metrics, wherein the respective accuracy indicators are indicative of a number of the plurality of variances that are replicated using the reduced dimension metrics;
    selecting at least one of the plurality of dimension reduction ML models by identifying a dimension reduction ML model that minimizes the respective number of reduced dimension metrics and maximizes the respective accuracy indicator; and
    applying the selected dimension reduction ML model on a second plurality of data streams to detect at least one anomaly event in the low dimensional space, the second plurality of data streams representative of second physical performance metrics.

2. The method of claim 1, wherein each of the plurality of dimension reduction ML models perform principal component analysis to reduce a number of the physical performance metrics to a smaller number of reduced dimension metrics.

3. The method of claim 1, wherein selecting one of the plurality of dimension reduction ML models is based on a maximum number of reduced dimension metrics and a minimum replication accuracy parameter.

4. The method of claim 1, further comprising:
upon detecting the at least one anomaly event in the low dimension space, transforming the reduce dimension metrics in the low dimension space to the high dimension space by identifying a subset of the second physical performance metrics contributing to the at least one anomaly event.

5. The method of claim 4, wherein identifying the subset of the second physical performance metrics comprises:
ranking the second physical performance metrics by an order of contribution to the reduced dimension metrics; and
identifying a number of the highest ranked second physical performance metrics.

6. The method of claim 4,
wherein the detected at least one anomaly event is detected in at least one of the reduced dimension metrics, and
wherein transforming the reduce dimension metrics in the low dimension space to the high dimension space is based on determining a fractional contribution of each second physical performance metric to the at least one of the reduced dimension metrics in which the at least one anomaly event was detected.

7. The method of claim 1, further comprising:
generating a visualization of the at least one anomaly event, the visualization comprising a graphical user interface (GUI) that displays at least one of:
one or more of the reduced dimension metrics as time-series data;
a graph indicative of a number of second physical performance metrics that are of higher importance to the detected at least one anomaly event compared to remaining second physical performance metrics; and
one or more of the second plurality of data streams as time-series data.

8. The method of claim 1, wherein the one or more network entities service a fifth generation (5G) network.

9. The method of claim 1, wherein selecting the at least one of the plurality of dimension reduction ML models comprises:
defining a window comprising an upper bound number of reduced dimension metrics threshold and a lower bound accuracy indicator threshold; and
determining that the at least one of the plurality of dimension reduction ML models has a respective accuracy indicator that is greater than or equal to the lower bound accuracy indicator threshold and a respective number of reduced dimension metrics that is less than or equal to the upper bound number of reduced dimension metrics.

10. An anomaly detection system, comprising:
at least one memory configured to store instructions; and
one or more processors communicably coupled to the memory and configured to execute the instructions to:
generating a plurality of reduced dimension machine learning models by applying historical performance metrics from a plurality of network functions, each of the plurality of reduced dimension machine learning models configured to transform the historical performance metrics from high dimension space to low dimension space by generating a respective number of reduced dimension metrics and determine a respective accuracy indicator by replicating operational behavior of the plurality of network functions using the reduced dimension metrics, wherein the historical performance metrics comprise a plurality of variances, and wherein the respective accuracy indicators are indicative of a number of the plurality of variances that are replicated using the reduced dimension metrics; and
provide a dimensionality reduction engine by selecting a reduced dimension machine learning model of the plurality of reduced dimension machine learning models that minimizes the respective number of reduced dimension metrics and maximizes the respective accuracy indicator;
receive, from a plurality of network functions on a network, a first plurality of performance metrics;
generate one or more reduced dimension metrics by executing the dimensionality reduction engine on the first plurality of performance metrics that transforms the first plurality of performance metrics from a high dimension space to a low dimension space; and
detect one or more anomaly events from the one or more reduced dimension metrics in the low dimension space.

11. The anomaly detection system of claim 10, wherein the one or more processors are further configured to execute the instructions to:
upon detecting the one or more anomaly events from the one or more reduced dimension metrics in the low dimension space, transform the one or more reduced dimension metrics to the high dimension space by identifying a subset of the first plurality of performance metrics that contributed to the one or more anomaly events.

12. The anomaly detection system of claim 11, wherein identifying the subset of the first plurality of performance metrics comprises:
ranking the first plurality of performance metrics by an order of contribution to the one or more reduced dimension metrics; and
identifying a number of the highest ranked first plurality of performance metrics.

13. The anomaly detection system of claim 11, wherein the detected one or more anomaly events are detected in at least one of the one or more reduced dimension metrics, and wherein transforming the at least one reduced dimension metric to the high dimension space is based on based on determining a fractional contribution of each first plurality of performance metrics to the at least one of the reduced dimension metrics in which the one or more anomaly events were detected.

14. The anomaly detection system of claim 10, wherein the one or more processors are further configured to execute the instructions to:
generate a visualization of the one or more anomaly events, the visualization comprising a graphical user interface (GUI) configured to display at least one of:
at least one of the one or more reduced dimension metrics as time-series data;
a graph indicative of a number of the first plurality of performance metrics that are of higher importance to the detected one or more anomaly events compared to remaining first plurality of performance metrics; and one or more of the first plurality of performance metrics as time-series data.

15. The anomaly detection system of claim 10, wherein the network comprises a fifth generation (5G) network.

16. A system, comprising:

at least one memory configured to store instructions; and
one or more processors communicably coupled to the memory and configured to execute the instructions to:

collect a first plurality of data streams from network functions on a network, the first plurality of data streams are representative of physical performance metrics, wherein the physical performance metrics comprise a plurality of variances;

create a plurality of dimension reduction machine learning (ML) models by inputting the first plurality of data streams to a principal component analysis ML algorithm, the plurality of dimension reduction ML models configured to (i) generate a respective number of reduced dimension metrics by transforming the first plurality of data streams from high dimensional space to low dimensional space and (ii) determine respective accuracy indicators by replicating behavior of the network functions using the one or more reduce dimension metrics, wherein the respective accuracy indicators are indicative of a number of the plurality of variances that are replicated using the reduced dimension metrics;

select at least one of the plurality of dimension reduction ML models by optimizing the respective number of reduced dimension metrics and the respective accuracy indicators; and store the selected at least one of the plurality of dimension reduction ML models to a model registry.

17. The system of claim 16, wherein the one or more processors are further configured to execute the instructions to:

receive at least one input indicative of at least one of a maximum number of reduced dimension metrics and a minimum accuracy indicator, wherein selecting the at least one of the plurality of dimension reduction ML models is based on the at least one input.

18. The system of claim 16, wherein the one or more processors are further configured to execute the instructions to:

receive a second plurality of data streams representative of a second physical performance metrics; and generate at least one reduced dimension metric based on the second plurality of data streams as input into the at least one selected dimension reduction ML model.

19. The system of claim 18, wherein the one or more processors are further configured to execute the instructions to:

detect at least one anomaly event in the reduced dimension metrics.

20. The system of claim 16, wherein the network is a fifth generation (5G) network.

* * * * *